United States Patent
Tatei

(10) Patent No.: US 12,038,186 B2
(45) Date of Patent: Jul. 16, 2024

(54) AIR-CONDITIONING SYSTEM WITH SIGNAL INTENSITY ADJUSTMENT

(71) Applicant: Mitsubishi Electric Corporation, Tokyo (JP)

(72) Inventor: Shuichi Tatei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 328 days.

(21) Appl. No.: 17/264,675

(22) PCT Filed: Aug. 8, 2019

(86) PCT No.: PCT/JP2019/031401
§ 371 (c)(1),
(2) Date: Jan. 29, 2021

(87) PCT Pub. No.: WO2020/066335
PCT Pub. Date: Apr. 2, 2020

(65) Prior Publication Data
US 2021/0332999 A1    Oct. 28, 2021

(30) Foreign Application Priority Data
Sep. 28, 2018 (WO) .................. PCT/JP2018/036580

(51) Int. Cl.
*F24F 11/32*   (2018.01)
*F24F 1/0007*  (2019.01)
(Continued)

(52) U.S. Cl.
CPC ............ *F24F 11/32* (2018.01); *F24F 1/0007* (2013.01); *F24F 11/56* (2018.01); *F24F 11/64* (2018.01);
(Continued)

(58) Field of Classification Search
CPC ......... F24F 11/30; F24F 11/56; H04B 17/318; H04B 17/27; H04B 1/3838; H04B 17/23;
(Continued)

(56) References Cited

U.S. PATENT DOCUMENTS 7,163,158 B2 * 1/2007 Rossi ...................... F24F 11/47
340/310.17
7,916,085 B2 * 3/2011 Kimball ................... G01S 3/04
342/465
(Continued)

FOREIGN PATENT DOCUMENTS

JP   2002-330483 A   11/2002
JP   2002-345051 A   11/2002
(Continued)

OTHER PUBLICATIONS

Extended European Search Report dated Oct. 18, 2021 issued in corresponding European patent application No. 19865726.4.
(Continued)

*Primary Examiner* — Darrin D Dunn
(74) *Attorney, Agent, or Firm* — Posz Law Group, PLC

(57) ABSTRACT

An air-conditioning system includes: a plurality of indoor units including respective wireless communication units each of which emits radio waves; and a mobile terminal unit configured to wirelessly communicate with each of the wireless communication units. The mobile terminal unit detects the radio waves emitted by the wireless communication units, and makes a notification indicating a presence of one or ones of the indoor units that are determined operable based on radio wave intensities of the detected radio waves.

11 Claims, 14 Drawing Sheets

(51) Int. Cl.
  *F24F 11/56*    (2018.01)
  *F24F 11/64*    (2018.01)
  *F24F 11/65*    (2018.01)
  *G05B 15/02*    (2006.01)
  *G08C 17/02*    (2006.01)
  *F24F 110/10*   (2018.01)
  *F24F 120/14*   (2018.01)
  *F24F 140/00*   (2018.01)

(52) U.S. Cl.
  CPC .............. *F24F 11/65* (2018.01); *G05B 15/02* (2013.01); *G08C 17/02* (2013.01); *F24F 2110/10* (2018.01); *F24F 2120/14* (2018.01); *F24F 2140/00* (2018.01)

(58) Field of Classification Search
  CPC ..... H04W 4/029; H04W 76/10; H04W 8/005; H04W 52/283; H04W 52/245; H04W 52/282; H04W 88/02; G05B 15/02; G05B 2219/2642; G05B 2219/2614
  See application file for complete search history.

(56) References Cited

U.S. PATENT DOCUMENTS

| | | | | |
|---|---|---|---|---|
| 8,606,293 | B2* | 12/2013 | Kim | G06Q 30/0261 455/418 |
| 8,838,135 | B2* | 9/2014 | Moshfeghi | G06Q 20/3224 455/456.1 |
| 9,173,061 | B2* | 10/2015 | Varoglu | H04W 4/021 |
| 9,386,544 | B2* | 7/2016 | Karaoguz | H04W 52/0209 |
| 10,217,346 | B1* | 2/2019 | Zhang | G01S 5/0278 |
| 10,631,123 | B2* | 4/2020 | O'Keeffe | H04W 4/80 |
| 10,698,118 | B1* | 6/2020 | Varoglu | G01S 19/49 |
| 11,234,114 | B2* | 1/2022 | Yokoyama | H04W 4/40 |
| 2005/0124305 | A1* | 6/2005 | Stichelbout | H04W 52/283 455/117 |
| 2008/0198034 | A1 | 8/2008 | Nakano | |
| 2008/0307025 | A1* | 12/2008 | Licul | H04W 64/00 708/308 |
| 2013/0178253 | A1* | 7/2013 | Karaoguz | H04W 52/0209 455/574 |
| 2014/0069131 | A1* | 3/2014 | Masui | F24F 11/46 62/180 |
| 2014/0249771 | A1* | 9/2014 | Yang | G01C 21/206 702/150 |
| 2016/0258638 | A1* | 9/2016 | Waseen | H04W 4/70 |
| 2017/0046947 | A1 | 2/2017 | Hou et al. | |
| 2017/0180937 | A1* | 6/2017 | Vaccari | G06Q 50/01 |
| 2018/0246559 | A1* | 8/2018 | Namgoong | G06F 1/3206 |
| 2019/0101304 | A1* | 4/2019 | Yoon | F24F 11/62 |
| 2019/0107582 | A1* | 4/2019 | Vissa | H02J 50/20 |
| 2019/0320472 | A1 | 10/2019 | Okuno et al. | |

FOREIGN PATENT DOCUMENTS

| | | |
|---|---|---|
| JP | 2003-284169 A | 10/2003 |
| JP | 2005-106355 A | 4/2005 |
| JP | 2008-131532 A | 6/2008 |
| JP | 2010-199832 A | 9/2010 |
| JP | 2016070838 A | 5/2016 |
| JP | 2017-075779 A | 4/2017 |
| JP | 2017-531329 A | 10/2017 |
| JP | 2017-203598 A | 11/2017 |
| WO | 2017/208344 A1 | 12/2017 |
| WO | 2018/127993 A1 | 7/2018 |

OTHER PUBLICATIONS

International Search Report of the International Searching Authority mailed Nov. 13, 2018 for the corresponding International application No. PCT/JP2018/036580 (and English translation).
International Search Report of the International Searching Authority mailed Sep. 3, 2019 for the corresponding International application No. PCT/JP2019/031401 (and English translation).

* cited by examiner

AIR-CONDITIONING SYSTEM WITH SIGNAL INTENSITY ADJUSTMENT

CROSS REFERENCE TO RELATED APPLICATION

This application is a U.S. national stage application of International Application No. PCT/JP2019/031401, filed on Aug. 8, 2019, which is based on International Application No. PCT/JP2018/036580, filed on Sep. 28, 2018, the contents of which are incorporated herein by reference.

TECHNICAL FIELD

The present disclosure relates to an air-conditioning system that conditions air with a plurality of indoor units installed in a building such as an office or a store.

BACKGROUND

In general, in a room or rooms of a building in which a plurality of indoor units are installed, a centralized controller is used to operate the plurality of indoor units. In this case, a floor plan is displayed on a screen on the centralized controller. Furthermore, in order that the locations of the indoor units be seen, images of the indoor units are superimposed on the floor plan on the screen. Thus, a user can find his or her location on the floor plan, and operate one of the indoor units that is located close to the user. This method has generally been applied.

However, in the above method, in particular, in the case where the indoor units are concealed type packaged indoor units, it is hard to visually find the indoor unit close to the user. Even in the case where the images of the indoor units are superimposed on the floor plan displayed on the screen of the centralized controller, it is hard for the user to recognize the indoor unit close to the user.

In view of the above, as a technique that solves the above problem, the following technique is provided: a remote control device capable of bidirectionally exchanging data signals with a plurality of devices, using radio waves, is provided, and at the time of initial setting, data including ID codes of the plurality of devices is registered in association with the result of an averaging process to average radio wave intensities of data signals for a predetermined time period, whereby a device or devices under control of the remote control device can easily be operated (see Patent Literature 1).

According to Patent Literature 1, a plurality of operation targets such as air-conditioning apparatuses have unique IDs. At the time of initial setting, these apparatuses notify the remote control device of IDs of the apparatuses, and the intensities of radio waves emitted by the apparatuses are registered in association with the IDs of the apparatuses in the remote controller. Thus, it is possible to limit an apparatus to be operated to an apparatus located close to the user, and thus operate the apparatus.

PATENT LITERATURE

Patent Literature 1: Japanese Unexamined Patent Application Publication No. 2003-284169

However, in Patent Literature 1, since IDs are registered in the remote controller at the time of initial setting, the initial setting must be repeated in an environment where the position of the operation target is often changed. Thus, the operation target cannot be flexibly changed. Therefore, it is not possible to easily operate the apparatus close to the user.

SUMMARY

The present disclosure is applied to solve the above problem, and relates to an air-conditioning system that enables an indoor unit close to the user to be easily operated.

An air-conditioning system according to an embodiment of the present disclosure includes: a plurality of indoor units including respective wireless communication units each of which emits radio waves; and a mobile terminal unit configured to wirelessly communicate with each of the wireless communication units. The mobile terminal unit detects the radio waves emitted by the wireless communication units, and makes a notification indicating a presence of one or ones of the indoor units that are determined operable based on radio wave intensities of the detected radio waves.

In the air-conditioning system of the above embodiment, the mobile terminal unit detects radio waves emitted by the wireless communication units, and makes a notification indicating the presence of an operable indoor unit or units, based on the intensities of the detected radio waves. In such a manner, since the mobile terminal makes a notification indicating the presence of the operable indoor unit or units located nearby and having a high radio wave intensity, based on the detected radio wave intensity, that is, since the mobile terminal makes a notification indicating the presence of the operable indoor unit or units close to the user, it is possible to easily operate the operable indoor unit close to the user even in the environment where the position of the indoor unit is often changed.

DESCRIPTION OF EMBODIMENTS

Embodiments of the present disclosure will be described with reference to the drawings. The following descriptions concerning the embodiments are not limiting. In each of the drawings, the relationship in size between components may be different from the actual one.

Embodiment 1

Figure 1:
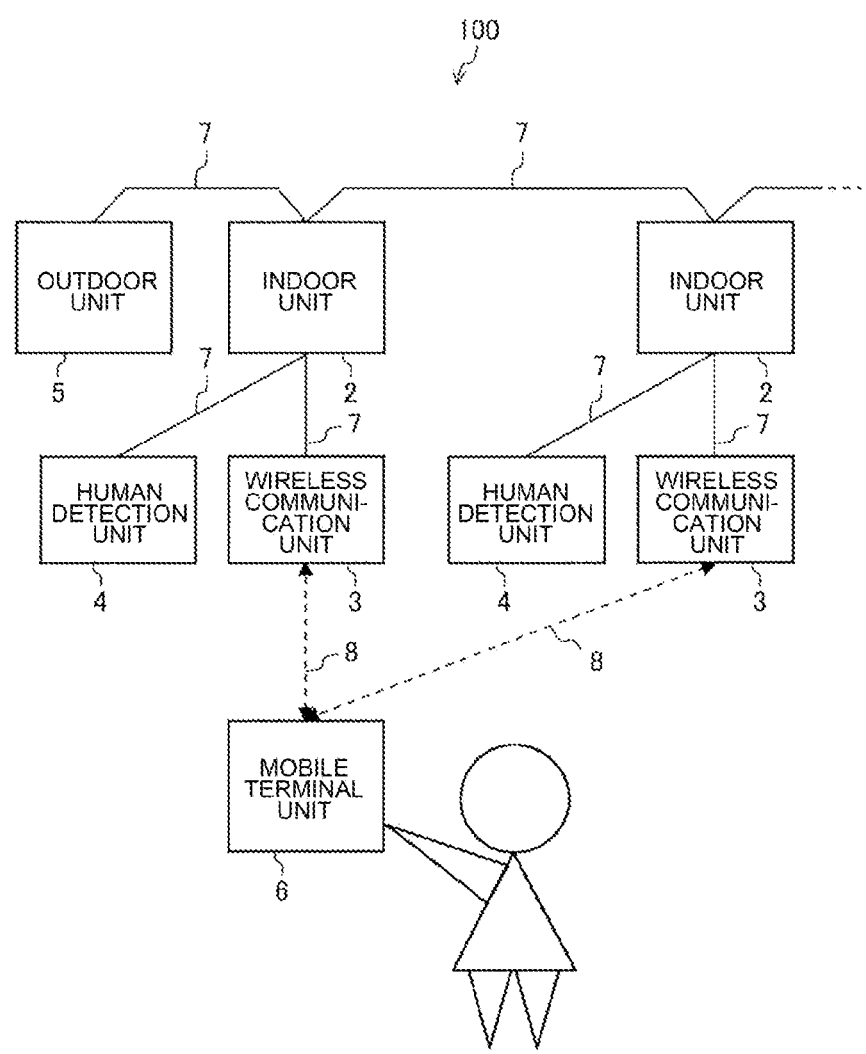
FIG. 1 is a schematic diagram illustrating a configuration of an air-conditioning system according to Embodiment 1 of the present disclosure.

FIG. 1 is a schematic diagram illustrating a configuration of an air-conditioning system 100 according to Embodiment 1 of the present disclosure.

First of all, the configuration of the air-conditioning system 100 according to Embodiment 1 will be described. The air-conditioning system 100 includes a plurality of indoor units 2 each of which conditions air in an air-conditioned space, an outdoor unit or units 5 that form along with the indoor units 2 refrigerant circuits, and a mobile terminal unit 6 that communicates with each of the indoor units 2. Furthermore, each of the indoor units 2 includes a wireless communication unit 3 that emits radio waves, and a human detection unit 4 that detects a person.

To be more specific, the indoor units 2 and the outdoor unit or units 5 form refrigerant circuits in which refrigerant circulates. To be more specific, in each of refrigerant systems, an associated indoor unit 2 is connected to an outdoor unit 5 by a wired communication lines 7. It should be noted that each of the refrigerant systems may include a plurality of indoor units 2 and a plurality of outdoor units 5. The indoor units 2 can bidirectionally communicate with the same outdoor unit 5 or respective outdoor units 5 via the wired communication lines 7.

To each of the indoor unit 2, the wireless communication unit 3 and the human detection unit 4 are connected via the communicable wired communication line 7 that enables bidirectional communication to be performed. In Embodiment 1, one wireless communication unit 3 is connected to one indoor unit 2; however, this is not limiting. For example, one wireless communication unit 3 may be connected to two indoor units 2. That is, one wireless communication unit 3 may be shared among a plurality of indoor units 2.

The wired communication line 7 is configured according to common communication standards such as Ethernet (registered trademark) or two-wire Universal Asynchronous Receiver Transmitter (UART), or unique communication standards.

It should be noted that the wireless communication unit 3 and the human detection unit 4 may be provided separate from the indoor unit 2, or may be incorporated in the indoor unit 2. In the case where the wireless communication unit 3 and the human detection unit 4 are incorporated in the indoor unit 2, the wired communication line 7 can be configured according to common communication standards such as Inter-Integrated Circuit (I2C).

The wireless communication unit 3 can bidirectionally communicate with the mobile terminal unit 6 via a radio communication channel 8. It should be noted that the radio communication channel 8 is configured in accordance with common communication standards such as Wi-Fi (registered trademark), Bluetooth (registered trademark), or ZigBee (registered trademark).

The human detection unit 4 detects a person who is present in the vicinity of the indoor unit 2, that is, a person who is present in a certain range from the indoor unit 2, and is, for example, a thermo viewer, a camera, or a human detecting sensor. The human detection unit 4 can not only detect radiation heat, but also identify a person and detect a movement by using of use of acceleration data stored in the mobile terminal unit 6, a pyroelectric sensor called Move Eye (registered trademark), an acceleration sensor, and a personal ID using radio waves such as Bluetooth (registered trademark). When the acceleration rate detected by the human detection unit is high, a radio sampling period of the wireless communication unit 3 may be decreased. When the acceleration rate is low, the radio sampling period of the wireless communication unit 3 may be increased. It should be noted that the radio wave intensity of radio waves to be emitted by the wireless communication unit 3 may be changed instead of the sampling period. In such a manner, the sampling period can be changed depending on the acceleration rate by controlling the sampling period based on the acceleration rate, whereby the effect of a measurement noise of the radio wave intensity of radio waves can be reduced. Furthermore, an indoor unit 2 that is indicated on a display of the mobile terminal unit 6 as an operation target, that is, an indoor unit to be operated, can be prevented from being frequently changed, and the operability for the user can be improved. Furthermore, the battery consumption of the mobile terminal unit 6 can be reduced. It should be noted that the certain range from the indoor unit 2 is a certain range that is set in distance with respect to the indoor unit 2 in the air-conditioned space, and the air-conditioning system 100 according to Embodiment 1 may be configured such that the human detection units 4 are not provided.

The wireless communication unit 3 and the human detection unit 4 are disposed in a main body of the indoor unit 2, or disposed close to an air outlet or an air inlet of the indoor unit 2, or at a duct of the indoor unit 2 in the case where the indoor unit 2 is concealed type packaged indoor unit. It should be noted that the wireless communication unit 3 and the human detection unit 4 may be incorporated in or attached to the indoor unit 2.

The mobile terminal unit 6 is, for example, a commercially available smartphone or a tablet personal computer, that is, it may be a device that can wirelessly communicate with the wireless communication unit 3. In the mobile terminal unit 6, an application program to operate the air-conditioning system 100 is installed.

Figure 2:
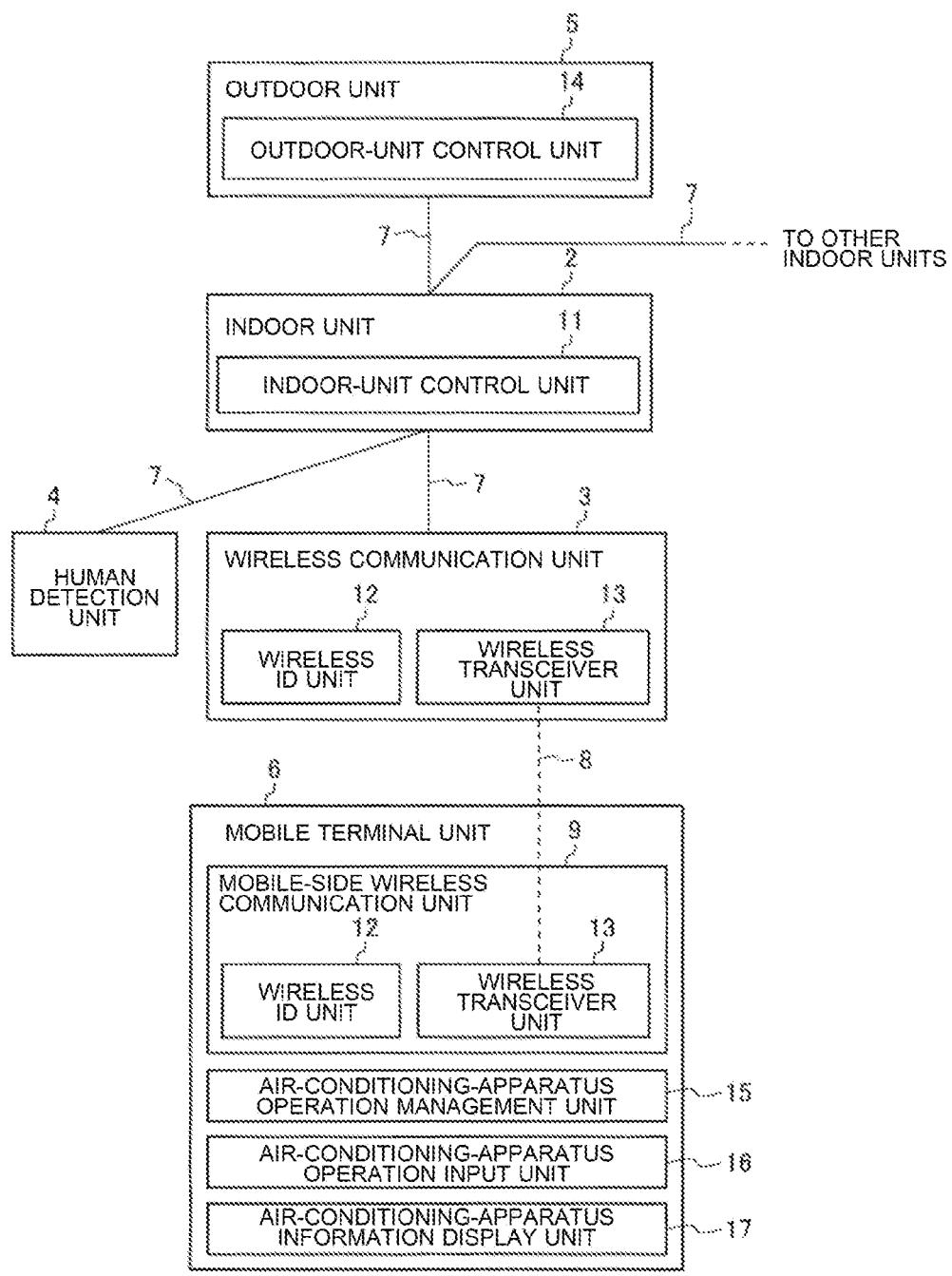
FIG. 2 is a block diagram illustrating an internal processing configuration of the air-conditioning system according to Embodiment 1 of the present disclosure.

FIG. 2 is a block diagram illustrating an internal processing configuration of the air-conditioning system 100 according to Embodiment 1 of the present disclosure.

Next, the internal processing configuration of the air-conditioning system 100 according to Embodiment 1 will be described.

The indoor unit 2 includes an indoor-unit control unit 11. The indoor-unit control unit 11 controls the indoor unit 2 to perform an air-conditioning operation, in conjunction with the outdoor unit 5 that is connected to the indoor unit 2 by a wired communication line 7 in the same refrigerant system and another or other indoor units 2 connected to the indoor unit 2 by wired communication lines 7.

The wireless communication unit 3 includes a wireless ID unit 12 and a wireless transceiver unit 13. The wireless communication unit 3 includes a control circuit that includes, for example, an MCU, a RAM, or a ROM, and is used to control the wireless ID unit 12 and the wireless transceiver unit 13.

The wireless ID unit 12 records an ID uniquely assigned to the wireless communication unit 3, and is, for example, a ROM included in the wireless communication unit 3. As the ID, for example, a BD address or a MAC address can be used.

The wireless transceiver unit 13 performs transmission and reception via the radio communication channel 8, and is a digital signal processing circuit, an analog signal processing circuit, or an antenna circuit.

The outdoor unit 5 includes an outdoor-unit control unit 14. The outdoor-unit control unit 14 controls the outdoor unit 5 to perform the air-conditioning operation, in conjunction with the indoor unit 2 that is connected to the outdoor unit 5 by the wired communication line 7 in the same refrigerant system and another or other outdoor units 5 connected to the outdoor unit 5 by the wired communication lines 7.

The mobile terminal unit 6 includes a mobile-terminal side wireless communication unit 9, an air-conditioning-apparatus operation management unit 15, an air-conditioning-apparatus operation input unit 16, and an air-conditioning-apparatus information display unit 17. Furthermore, the mobile terminal unit 6 has an application program that is installed in the mobile terminal unit 6 to cause the mobile terminal unit 6 to perform a process of detecting radio waves emitted by the wireless transceiver units 13, and of indicating on the air-conditioning-apparatus information display unit 17, the presence of an indoor unit or units 2 that are determined operable based on the intensities of the detected radio waves, and a process of transmitting an air-conditioning operation command (which will be described later) to the wireless transceiver unit 13. The application program installed in the mobile terminal unit 6 is stored in the air-conditioning-apparatus operation management unit 15. However, the application program may be stored in a storage unit other than the air-conditioning-apparatus operation management unit 15. Also, the application program may include ID data to identify a person. In the mobile terminal unit 6, the application program includes ID data and is installed in advance. Alternatively, the mobile terminal unit 6 has an ID card tag function capable of reading an ID card containing ID data.

The mobile-terminal side wireless communication unit 9 has functions equivalent to those of the wireless communication unit 3 of the indoor unit 2, and can be made to have the functions that the mobile terminal unit 6 originally has.

Using the application program, the air-conditioning-apparatus operation management unit 15 controls a setting operation such as starting of the operation of the indoor unit 2, stopping of the operation of the indoor unit 2, and temperature setting of the indoor unit 2, and also controls the wireless communication unit 3 of the indoor unit 2. Furthermore, the air-conditioning-apparatus operation management unit 15 has a function of measuring the radio wave intensity of received radio waves such as received signal strength indication (RSSI), using the application program. In addition, the air-conditioning-apparatus operation management unit 15 has a function of storing the radio ID of the wireless communication unit 3 of the indoor unit 2 using the application program, and the function of storing a radio ID may be fulfilled by an MCU, a RAM, a ROM, a flash memory, or other devices.

When the mobile terminal unit 6 receives radio waves from the wireless communication unit 3 of the indoor unit 2, and the air-conditioning-apparatus operation management unit 15 determines that the indoor unit 2 is located close to the mobile terminal unit 6, the air-conditioning-apparatus operation management unit 15 stores the radio ID of the wireless communication unit 3. It should be noted that the radio wave intensity of radio waves and the distance are related to each other, and when the indoor unit 2 including the wireless communication unit 3 of the indoor unit 2 emits radio waves with a higher intensity, it can be determined that the indoor unit 2 is located closer to the mobile terminal unit 6. Therefore, the air-conditioning-apparatus operation management unit 15 determines whether the indoor unit 2 is located close to the mobile terminal unit 6, based on the radio wave intensity of the radio waves received from the wireless communication unit 3 of the indoor unit 2. It should be noted that when the mobile terminal unit 6 does not receive radio waves from the wireless communication unit 3 of the indoor unit 2 for a predetermined period of time, the air-conditioning-apparatus operation management unit 15 determines that the indoor unit 2 is no longer close to the mobile terminal unit 6. Thus, the air-conditioning-apparatus operation management unit 15 erases the stored radio ID.

The air-conditioning-apparatus operation input unit 16 is used by the user and enables the user to do, from the mobile terminal unit 6 to the air-conditioning-apparatus operation input unit 16, input for a setting operation such as starting of the operation of the indoor unit 2, stopping of the operation of the indoor unit 2 and temperature setting of the indoor unit 2. The air-conditioning-apparatus operation input unit 16 includes buttons and a touch panel included in the mobile terminal unit 6.

The air-conditioning-apparatus operation input unit 16 can obtain the input for the setting operation such as starting of the operation, stopping of the operation, and temperature setting of the indoor unit 2, using the application program that runs on the mobile terminal unit 6. Furthermore, the mobile-terminal side wireless communication unit 9 can communicate with the wireless communication unit 3 of the indoor unit 2, using the application program that runs on the mobile terminal unit 6.

The air-conditioning-apparatus information display unit 17 displays information that is necessary for the user to do, from the mobile terminal unit 6, input for the setting operation for the indoor unit 2 such as starting of the operation, stopping of the operation, and temperature setting. The air-conditioning-apparatus information display unit 17 is a touch panel included in the mobile terminal unit 6. It should be noted that the air-conditioning-apparatus operation input unit 16 and the air-conditioning-apparatus information display unit 17 may be separate units, or may be combined into a single unit.

Radio waves transmitted and received between the wireless communication unit 3 and the mobile-terminal side wireless communication unit 9 include radio ID information on a transmission side, address information on the transmission side, and operation command information for the indoor unit 2.

The air-conditioning system 100 according to Embodiment 1 automatically determines an indoor unit 2 to be operated as an operation target, based on the radio wave intensity of radio waves from the wireless communication units 3 of the indoor units 2.

Figure 3:
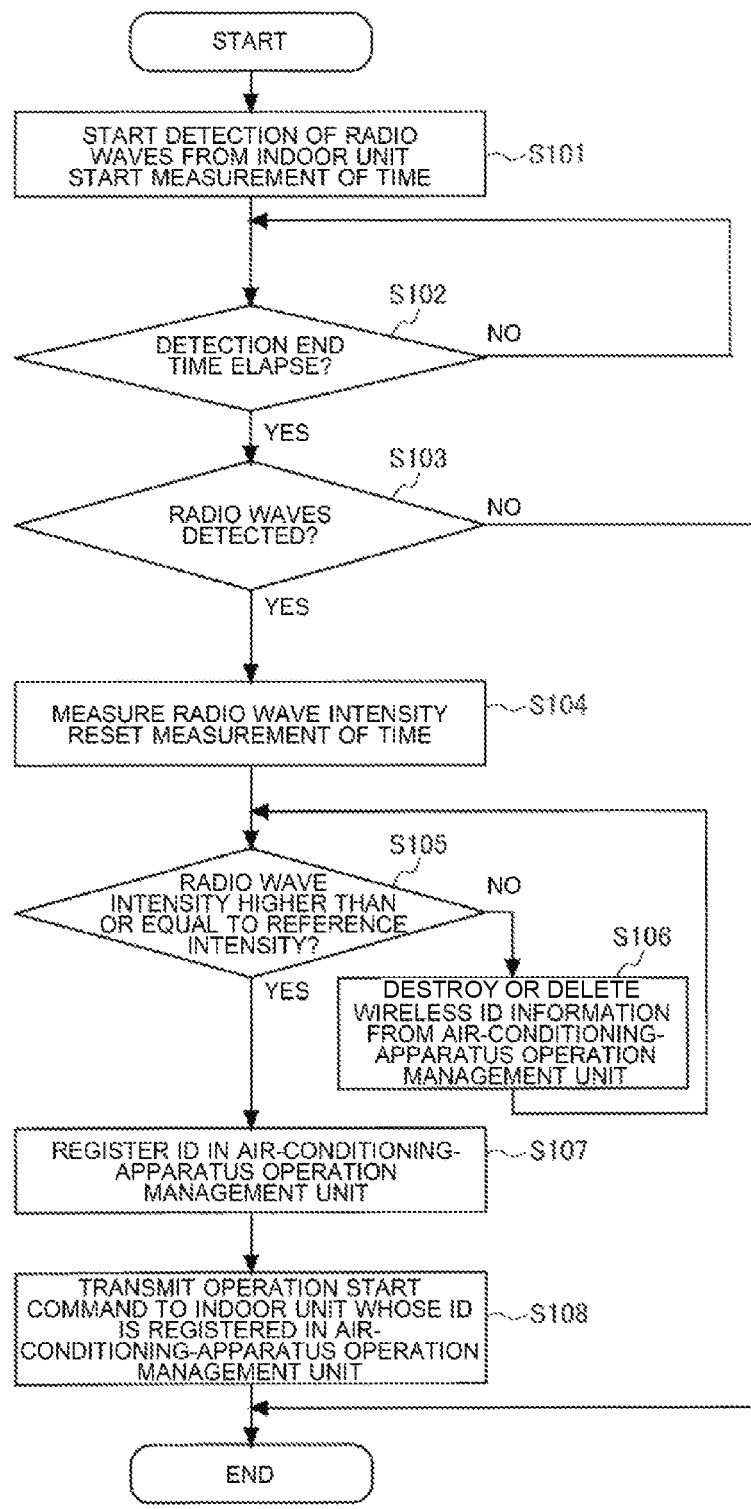
FIG. 3 is a flowchart of processing by a mobile terminal unit up to the start of the operation of an indoor unit in the air-conditioning system according to Embodiment 1 of the present disclosure.

FIG. 3 is a flowchart of processing by the mobile terminal unit 6 up to the start of the operation of the indoor unit 2 in the air-conditioning system 100 according to Embodiment 1 of the present disclosure.

The processing by the mobile terminal unit 6 up to the start of the operation of the indoor unit 2 in the air-conditioning system 100 according to Embodiment 1 will be described with reference to FIG. 3.

(Step S101)

The wireless communication units 3 of the indoor units 2 emit radio waves with a constant intensity. It should be noted that the wireless communication units 3 emit radio waves with the same intensity. Furthermore, the wireless communication units 3 emit radio waves regardless of whether each of the respective indoor units 2 is turned on or off. Then, when receiving an input for starting the operation from the air-conditioning-apparatus operation input unit 16, the air-conditioning-apparatus operation management unit 15 starts a radio-wave detection operation to detect radio waves emitted from the wireless communication unit 3 of the indoor unit 2, using the mobile-terminal side wireless communication unit 9. Furthermore, the air-conditioning-apparatus operation management unit 15 starts measuring time that elapses from time at which the radio-wave detection operation is started.

(Step S102)

The air-conditioning-apparatus operation management unit 15 determines whether the time that elapses from the time at which the radio-wave detection operation is started reaches a detection end time. The detection end time is a predetermined time period for which the air-conditioning-apparatus operation management unit 15 performs the radio-wave detection operation. When the air-conditioning-apparatus operation management unit 15 determines that the time that elapses from the time at which the radio-wave detection operation is stated reaches the detection end time (YES), the operation start process of the indoor unit 2 ends. By contrast, when the air-conditioning-apparatus operation management unit 15 determines that the time that elapses from the time at which the radio-wave detection operation is stated does not reach the detection end time (NO), the radio-wave detection operation continues.

(Step S103)

In the case where the air-conditioning-apparatus operation management unit 15 detects radio waves (YES), the process proceeds to step S104. By contrast, in the case where the air-conditioning-apparatus operation management unit 15 does not detect radio waves (NO), the operation start process of the indoor unit 2 ends. It should be noted that in the case where the air-conditioning-apparatus operation management unit 15 does not detect radio waves, a notification such as a pop-up notification indicating that the operation cannot be performed may be provided to the mobile terminal unit 6. Alternatively, the radio-wave detection operation may continue until the air-conditioning-apparatus operation management unit 15 receives an input for ending the operation from the air-conditioning-apparatus operation input unit 16.

(Step S104)

The air-conditioning-apparatus operation management unit 15 confirms the radio ID of the wireless communication unit 3 that has transmitted the detected radio waves, and starts measuring the radio wave intensity of the radio waves. Furthermore, the air-conditioning-apparatus operation management unit 15 resets time measured as elapsed time from the time at which the radio-wave detection operation is started. In order to determine fluctuations of the radio wave intensity, the air-conditioning-apparatus operation management unit 15 obtains an average value or a central value from a plurality of measurement results to determine the radio wave intensity of the detected radio waves.

(Step S105)

The air-conditioning-apparatus operation management unit 15 determines whether the radio wave intensity of the detected radio waves that is determined in step S104 is higher than or equal to a predetermined reference intensity. The reference intensity is, for example, −70 dBm. Furthermore, in the case of detecting the radio wave intensity of radio waves as a level (for example, level 0 to level 5) as in a radio-wave intensity indicator of a smartphone, the reference intensity is, for example, level 3. When the air-conditioning-apparatus operation management unit 15 determines that the radio wave intensity of the detected radio waves is higher than or equal to the reference intensity (YES), the process proceeds to step S107. By contrast, when the air-conditioning-apparatus operation management unit 15 determines that the radio wave intensity of the detected radio waves is neither higher than nor equal to the reference intensity (NO), the process proceeds to step S106.

(Step S106)

The air-conditioning-apparatus operation management unit 15 destroys or erases the radio ID information on the wireless communication unit 3 of the indoor unit 2 that transmits radio waves whose intensity is less than the reference intensity.

When detecting a plurality of radio signals each having radio waves in step S103, the air-conditioning-apparatus operation management unit 15 performs the processes of S104 to S106 the same number of times as the detected radio signals.

(Step S107)

The air-conditioning-apparatus operation management unit 15 registers in the air-conditioning-apparatus operation management unit 15 itself, the radio ID of the wireless communication unit 3 of an indoor unit 2 that transmits radio waves whose intensity is higher than or equal to the reference intensity, in association with the information on the radio wave intensity of the radio waves.

(Step S108)

The air-conditioning-apparatus operation management unit 15 transmits an operation start command for starting the air-conditioning operation to the wireless communication unit 3 of the indoor unit 2, which has the radio ID registered in the air-conditioning-apparatus operation management unit 15. It should be noted that the operation start command is included in an air-conditioning operation command. The air-conditioning operation command further includes a setting change command for changing settings such as an operation mode, a set temperature, a wind direction, and a wind strength, and an operation stop command for stopping the air-conditioning operation. The air-conditioning-apparatus operation management unit 15 can transmit environment data such as temperature, humidity, $CO_2$ concentration, and ID data for identifying the mobile terminal unit 6, in addition to the operation start command. Moreover, the air-conditioning-apparatus operation management unit 15 may transmit commands and various types of data that are compatible not only with the air-conditioning system 100 but also with, for example, an illumination system.

It should be noted that in step S105, the air-conditioning-apparatus operation management unit 15 may determine the radio wave intensity of the detected radio waves that is determined in step S104, based on a predetermined first reference intensity (equivalent to the reference intensity described above) and a predetermined second reference intensity (<first radio wave intensity). In this case, the air-conditioning-apparatus operation management unit 15 determines whether the radio wave intensity of the detected radio wave determined in step S104 is higher than or equal to the predetermined second reference intensity. When the air-conditioning-apparatus operation management unit 15 determines that the radio wave intensity of the detected radio waves is neither higher than nor equal to the second reference intensity (NO), the process proceeds to step S106. By contrast, when determining that the radio wave intensity of the detected radio waves is higher than or equal to the second reference intensity (YES), the air-conditioning-apparatus operation management unit 15 causes the air-conditioning-apparatus information display unit 17 to display a notification notifying the user of an operable indoor unit or units 2 and the number of operable indoor units 2, and determines whether the radio wave intensity of the detected radio waves is higher than or equal to the first reference intensity. Then, when the air-conditioning-apparatus operation management unit 15 determines that the radio wave intensity of the detected radio waves is higher than or equal to the first reference intensity (YES), the process proceeds to step S107. By contrast, when the air-conditioning-apparatus operation management unit 15 determines that the radio wave intensity of the detected radio waves is neither higher than nor equal to the first reference intensity (NO), the process proceeds to step S106. That is, the first reference intensity is a reference value for determining whether or not to transmit an operation start command for starting the air-conditioning operation to the wireless communication unit 3 of the indoor unit 2, as well as the reference intensity described above, and the second reference intensity is a reference value for determining whether or not to notify the user of an operable indoor unit or units 2 and the number of operable indoor units 2. The first reference intensity and the second reference intensity are values that can be freely changed. Furthermore, since the air-conditioning-apparatus operation management unit 15 determines the radio wave intensity of the detected radio waves, based on the first reference intensity and the second reference intensity, it is possible to notify, in a wide area, the user of an operable indoor unit or units 2 and the number of operable indoor units 2, and to select an indoor unit 2 located close to the user as an indoor unit 2 to be given the operation start command. In such a manner, the presence of an operable indoor unit 2 which is located close to the user and from which radio waves having a high intensity is indicated as a notification, based on based on the radio wave intensity of the detected radio waves, that is, since the presence of the operable indoor unit 2 close to the user is indicated as a notification. It is therefore possible to easily operate the operable indoor unit or units 2 close to the user even in an environment in which the position of the indoor unit or units 2 is often changed. Therefore, the user can transmit an operation start command to the wireless communication unit 3 of an arbitrary indoor unit 2 by doing input for the setting operation for the arbitrary indoor unit 2 from the air-conditioning-apparatus operation management unit 15 of the mobile terminal unit 6, as a result of which the comfort can be improved. Furthermore, it is possible to automatically transmit an operation start command to the wireless communication unit 3 of an indoor unit 2 located close to the mobile terminal unit 6, and thus improve the comfort. In addition, even when an indoor unit 2 capable of perform a radio operation and the indoor unit 2 not capable of perform the radio operation are present together, it is possible to detect an operable indoor unit or units 2 from a wide area. It is therefore possible to reduce the probability with which no operable indoor unit 2 is detected.

Figure 4:
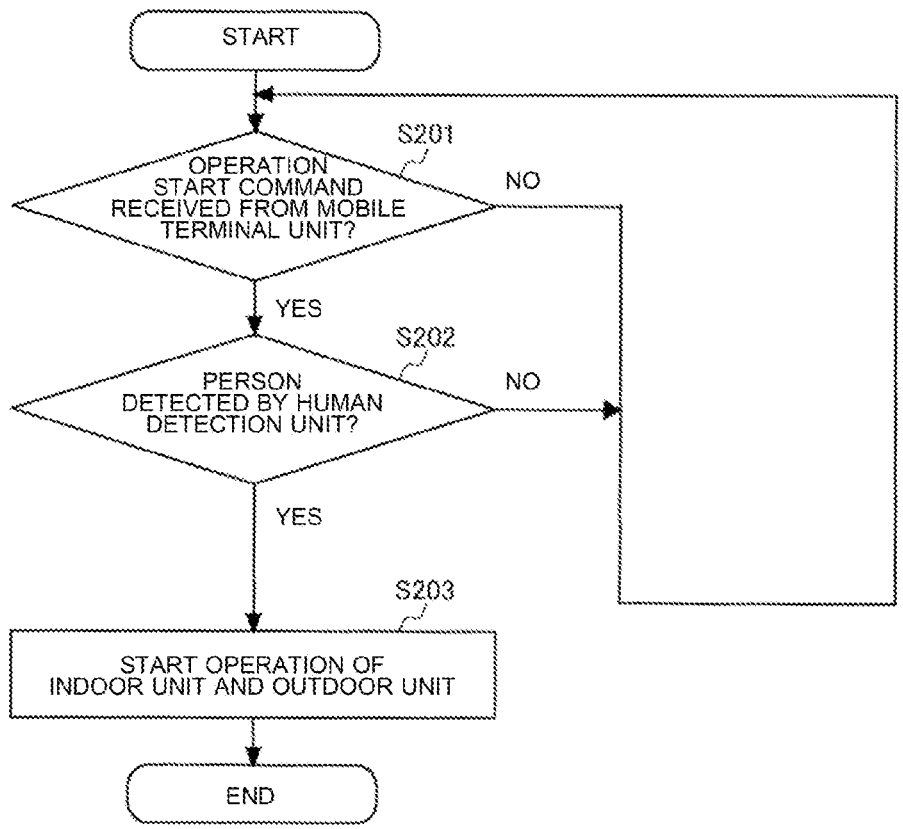
FIG. 4 is a flowchart of processing by an indoor unit up to the start of the operation in the air-conditioning system according to Embodiment 1 of the present disclosure.

FIG. 4 is a flowchart of processing by the indoor unit 2 up to the start of the operation thereof in the air-conditioning system 100 according to Embodiment 1 of the present disclosure.

The processing by the indoor unit 2 up to the start of the operation thereof in the air-conditioning system 100 according to Embodiment 1 will be described with reference to FIG. 4.

(Step S201)

The indoor-unit control unit 11 determines whether an operation start command is received from the mobile terminal unit 6 via the wireless communication unit 3 or not. When the indoor-unit control unit 11 determines that the operation start command is received from the mobile terminal unit 6 (YES), the process proceeds to step S202. By contrast, when the indoor-unit control unit 11 determines that the operation start command is not received from the mobile terminal unit 6 (NO), the process does not proceed until the operation start command is detected, that is, it is waited for that the operation start command is detected.

(Step S202)

The indoor-unit control unit 11 determines whether a person is detected in the air-conditioned space of the indoor unit 2 by the human detection unit 4 or not. When the indoor-unit control unit 11 determines that a person is detected in the air-conditioned space of the indoor unit 2 (YES), the process proceeds to step S203. By contrast, when the indoor-unit control unit 11 determines that a person is not detected in the air-conditioned space of the indoor unit 2 (NO), the process proceeds to step S201. A determination of whether or not a person is detected in the air-conditioned space of the indoor unit 2 is made to exclude the indoor unit 2 located in the air-conditioned space where no person is present, from operation targets that are indoor units 2 to be operated, and thereby to achieve energy saving. It should be noted that the detection of a person in the air-conditioned space of the indoor unit 2 by the human detection unit 4 may be performed before starting measurement of the radio wave intensity of radio waves.

Of various types of indoor units 2, a given kind of indoor unit 2 does not include a human detection unit 4. In such a kind of indoor unit 2, the determination process of step S202 may not be performed. In the indoor unit 2, when the indoor-unit control unit 11 determines that an operation start command is received from the mobile terminal unit 6 (YES) in the determination of step S201, the process proceeds to step S203.

(Step S203)

The indoor-unit control unit 11 starts the operation of the indoor unit 2, and starts the operation of the outdoor unit 5 by transmitting an operation start command to the outdoor-unit control unit 14 via the wired communication line 7, thereby performing the air-conditioning operation.

Figure 5:
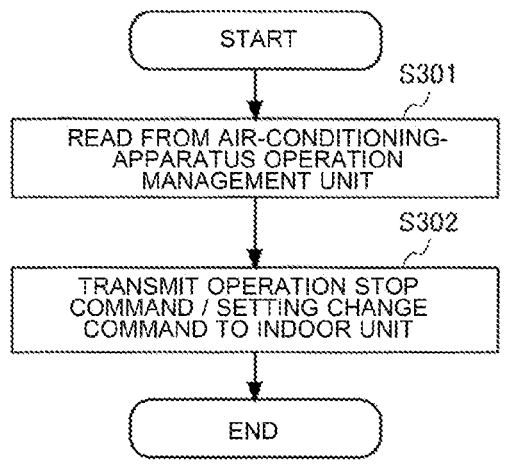
FIG. 5 is a flowchart of processing by the mobile terminal unit up to stopping of the operation of the indoor unit in the air-conditioning system according to Embodiment 1 of the present disclosure.

FIG. 5 is a flowchart of processing by the mobile terminal unit 6 up to stopping of the operation of an indoor unit 2 in the air-conditioning system 100 according to Embodiment 1 of the present disclosure.

The processing by the mobile terminal unit 6 up to stopping of the operation of an indoor unit 2 whose operation is to be stopped in the air-conditioning system 100 according to Embodiment 1 will be described with reference to FIG. 5.

(Step S301)

Upon receiving an input for stopping the operation from the air-conditioning-apparatus operation input unit 16, the air-conditioning-apparatus operation management unit 15 reads outs the radio ID registered therein.

(Step S302)

The air-conditioning-apparatus operation management unit 15 transmits an operation stop command to the wireless communication unit 3 of the indoor unit 2 that has the above read radio ID, from the mobile-terminal side wireless communication unit 9.

The operation for changing the settings such as temperature setting of the indoor unit 2 can be performed with a procedure that is the same as or similar to that of the flowchart of FIG. 5. In this case, the command transmitted from the mobile-terminal side wireless communication unit 9 in step S302 is a setting change command.

Figure 6:
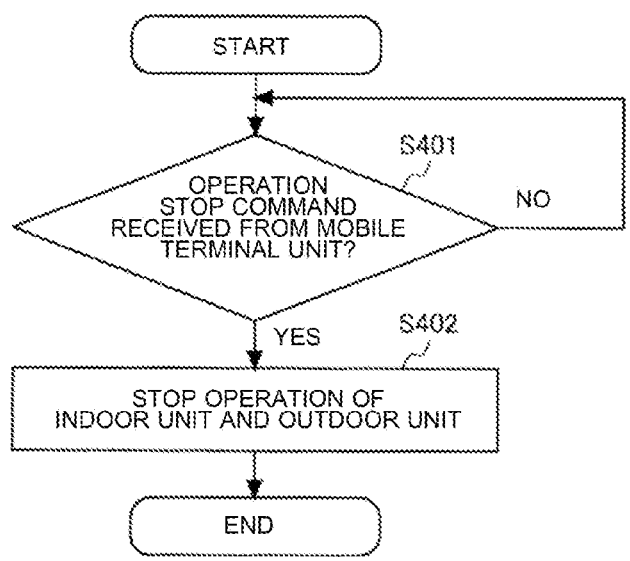
FIG. 6 is a flowchart of processing by the indoor unit up to stopping of the operation in the air-conditioning system according to Embodiment 1 of the present disclosure.

FIG. 6 is a flowchart of processing by an indoor unit 2 up to stopping of the operation in the air-conditioning system 100 according to Embodiment 1 of the present disclosure.

The processing by an indoor unit 2 whose operation is to be stopped, up to stopping of the operation of the indoor unit 2 in the air-conditioning in the air-conditioning system 100 according to Embodiment 1, will be descried with reference to FIG. 6.

(Step S401)

The indoor-unit control unit 11 determines whether an operation stop command is received from the mobile terminal unit 6 via the wireless communication unit 3 or not. When the indoor-unit control unit 11 determines that an operation stop command is received from the mobile terminal unit 6 (YES), the process proceeds to step S402. By contrast, when the indoor-unit control unit 11 determines that an operation stop command is not received from the mobile terminal unit 6 (NO), the process does not proceed until an operation stop command is received, that is, it is awaited for that the operation stop command is received.

(Step S402)

The indoor-unit control unit 11 stops the operation of the indoor unit 2, and also stops the operation of the outdoor unit 5 by transmitting an operation stop command to the outdoor-unit control unit 14 via the wired communication line 7, thereby stopping the air-conditioning operation.

As described above, the air-conditioning system 100 according to Embodiment 1 includes: the plurality of indoor units 2 each including the wireless communication unit 3 that emits radio waves; and the mobile terminal unit 6 that wirelessly communicates with each of the wireless communication units 3. The mobile terminal unit 6 detects radio waves emitted by the wireless communication units 3, and makes a notification indicating the presence of an indoor unit or units 2 that are determined operable based on the intensities of the detected radio waves.

Furthermore, the application program according to Embodiment 1 causes a computer to perform processes of detecting the radio waves emitted by the wireless communication units 3, and of making a notification indicating the presence of the above operable indoor unit or units based on the intensities of the detected radio waves.

In the air-conditioning system 100 and the application program of Embodiment 1, the mobile terminal unit 6 detects radio waves emitted by the wireless communication units 3, and makes a notification indicating the presence of an indoor unit or units 2 that are determined operable based on the intensities of the detected radio waves. In such a manner, the notification indicates the presence of the operable indoor unit or units 2 that are located close to the user and that emit radio waves whose intensity is high; that is, the notification indicates the presence of the operable indoor unit or units 2 that are located close to the user. It is therefore possible to easily operate the operable indoor unit or units 2 close to the user even in an environment in which the positions of the indoor units 2 are often changed.

It is hard to know whether the user could actually operate a certain indoor unit 2. In view of this, the indoor unit 2 or the mobile terminal unit 6 may be made to have a feedback function. For example, in the indoor unit 2, in the case where a light emitting unit such as an LED is provided, the reception of an input for an operation is indicated for the user as feedback by turning on the light emitting unit. Furthermore, in the mobile terminal unit 6, the above is indicated as the feedback to the user by emission of light or vibration. Also, as the feedback to the user, it may be indicated which of the indoor units has received the input for the operation, by displaying an address of the indoor unit 2 that has received the input for the operation, and also as the feedback, the user may be notified of the number of indoor units 2 that have received input for the operation.

In the air-conditioning system 100 according to Embodiment 1, each of the indoor units 2 includes the human detection unit 4 that detects a person. Of the indoor units 2, an indoor unit or units 2 that have received an operation start command via the wireless communication units 3 start the operation when the human detection unit 4 detects a person.

In the air-conditioning system 100 of Embodiment 1, of the indoor units 2 that have received an operation start command via the wireless communication units 3, only an indoor unit 2 in which the human detection unit 4 has detected a person starts the operation. Therefore, an indoor unit 2 in an air-conditioned space in which no person is present can be excluded from the operation targets, thereby contributing to energy saving. It should be noted that the indoor units 2 may be each configured such that the wireless communication unit 3 may receive from the mobile terminal unit 6, information on the radio wave intensity of radio waves and a radio detection angle obtained by, for example, three-point measurement, and detect a person in the air-conditioned space for the indoor unit 2 based on the radio wave intensity of the radio waves and radio detection angle that are indicated by the received information. In this case, the indoor unit 2 starts the operation only when a person is detected based on the radio wave intensity of the radio waves and the radio detection angle.

Embodiment 2

Embodiment 2 of the present disclosure will be described. Regarding Embodiment 3, descriptions that are made regarding Embodiment 1 and can also be applied to Embodiment 2 will be omitted, and components that are the same or equivalent to those in Embodiment 1 will be denoted by the same reference signs.

An air-conditioning system 100 according to Embodiment 2 causes indoor units 2 each of which emits radio waves having a radio wave intensity that is higher than or equal to a predetermined reference intensity, and is ranked N-th or higher to start to operate. It should be noted that N is "3", for example. N can be freely determined, for example, from the air-conditioning-apparatus operation input unit 16 by an administrator. Also, it should be noted that N may be determined by a user who is not the administrator.

Figure 7:
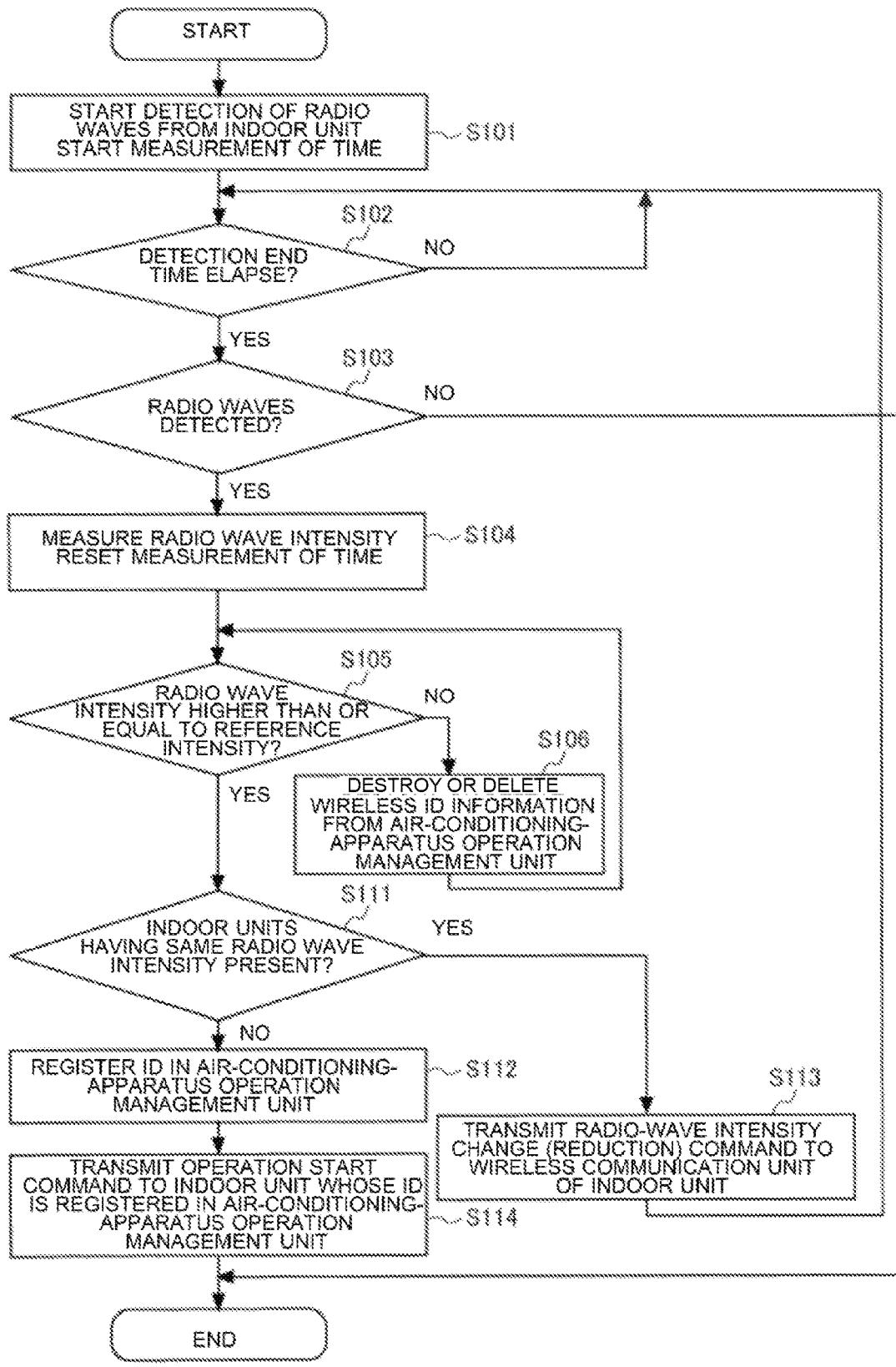
FIG. 7 is a flowchart of processing by a mobile terminal unit the start of the operation of an indoor unit in an air-conditioning system according to Embodiment 2 of the present disclosure.

FIG. 7 is a flowchart of processing by the mobile terminal unit 6 up to the start of the operation of the indoor unit 2 in the air-conditioning system 100 according to Embodiment 2 of the present disclosure.

The processing by the mobile terminal unit 6 up to the start of the operation of the indoor unit 2 in the air-conditioning system 100 according to Embodiment 2 will be described with reference to FIG. 7.

The processes of steps S101 to S106 are the same as those of Embodiment 1, and their descriptions will thus be omitted.

(Step S111)

The air-conditioning-apparatus operation management unit 15 checks radio IDs registered therein against information on radio wave intensities to determine whether radio IDs for the same radio wave intensity are present or a plurality of radio IDs for radio wave intensities within a predetermined range are present. This determination is made when the N-th radio wave intensity is not determined because a plurality of radio IDs are present for the same radio wave intensity or radio wave intensities close to each other in the neighborhood of the N-th radio wave intensity. That is, this determination is not made when there are radio IDs for the same radio wave intensity or radio wave intensities close to each other, whose rank or ranks are greatly different from that of the N-th radio wave intensity. When the air-conditioning-apparatus operation management unit 15 determines that radio IDs for the same radio wave intensity are present or radio IDs for radio wave intensities in a predetermined range are present (YES), the process proceeds to step S113. By contrast, when the air-conditioning-apparatus operation management unit 15 determines that radio IDs for the same radio wave intensity are not present and radio IDs for radio wave intensities in a predetermined range are not present (NO), the process proceeds to step S112. The radio wave intensities within the predetermined range are, for example, ±5 dBm. That is, when a radio ID for a radio wave intensity of −60 dBm and a radio ID for a radio wave intensity of −55 dBm are present, it is determined that a plurality of radio IDs for radio wave intensities within a predetermined range are present.

(Step S112)

The air-conditioning-apparatus operation management unit 15 ranks the detected radio waves in descending order of radio wave intensity, and registers in air-conditioning-apparatus operation management unit 15 itself, the radio IDs of wireless communication units 3 of indoor units 2 that emits radio waves having a radio wave intensity ranked N-th or higher in association with the information on the radio wave intensity.

(Step S113)

The air-conditioning-apparatus operation management unit 15 transmits a radio-wave intensity change command for reducing by a predetermined value the radio wave intensity of radio waves to be output, to the wireless communication units 3 of the indoor units 2 that have radio IDs for the same radio wave intensity or having radio IDs for radio wave intensities within a predetermined range. Then, the process proceeds to step S102. It should be noted that the amount of attenuation of radio waves varies depending on the distance, and the amount of attenuation of radio waves more greatly varies depending the distance as the radio wave intensity decreases to a lower value. Thus, the difference between the distances between the mobile terminal unit 6 and the indoor units 2 is more clarified and more easily determined, by decreasing the radio wave intensity of radio waves to be output from the wireless communication units 3. Instead of a radio-wave intensity change command for decreasing by a predetermined value, the radio wave intensity of radio waves to be output, a radio-wave intensity change command for increasing by a predetermined value, the radio wave intensity of radio waves to be output may be transmitted. Information on the change in radio wave intensity is registered in the air-conditioning-apparatus operation management unit 15. Furthermore, for example, after transmitting an air-conditioning operation command, the air-conditioning-apparatus operation management unit 15 transmits a radio-wave intensity change command for changing the radio wave intensity back to the original radio wave intensity to a wireless communication unit 3 of an indoor unit 2, in which the radio wave intensity of radio waves to be output has been changed.

(Step S114)

The air-conditioning-apparatus operation management unit 15 transmits an operation start command to a wireless communication unit or units 3 of an indoor unit or units 2 that have registered IDs.

Figure 8:
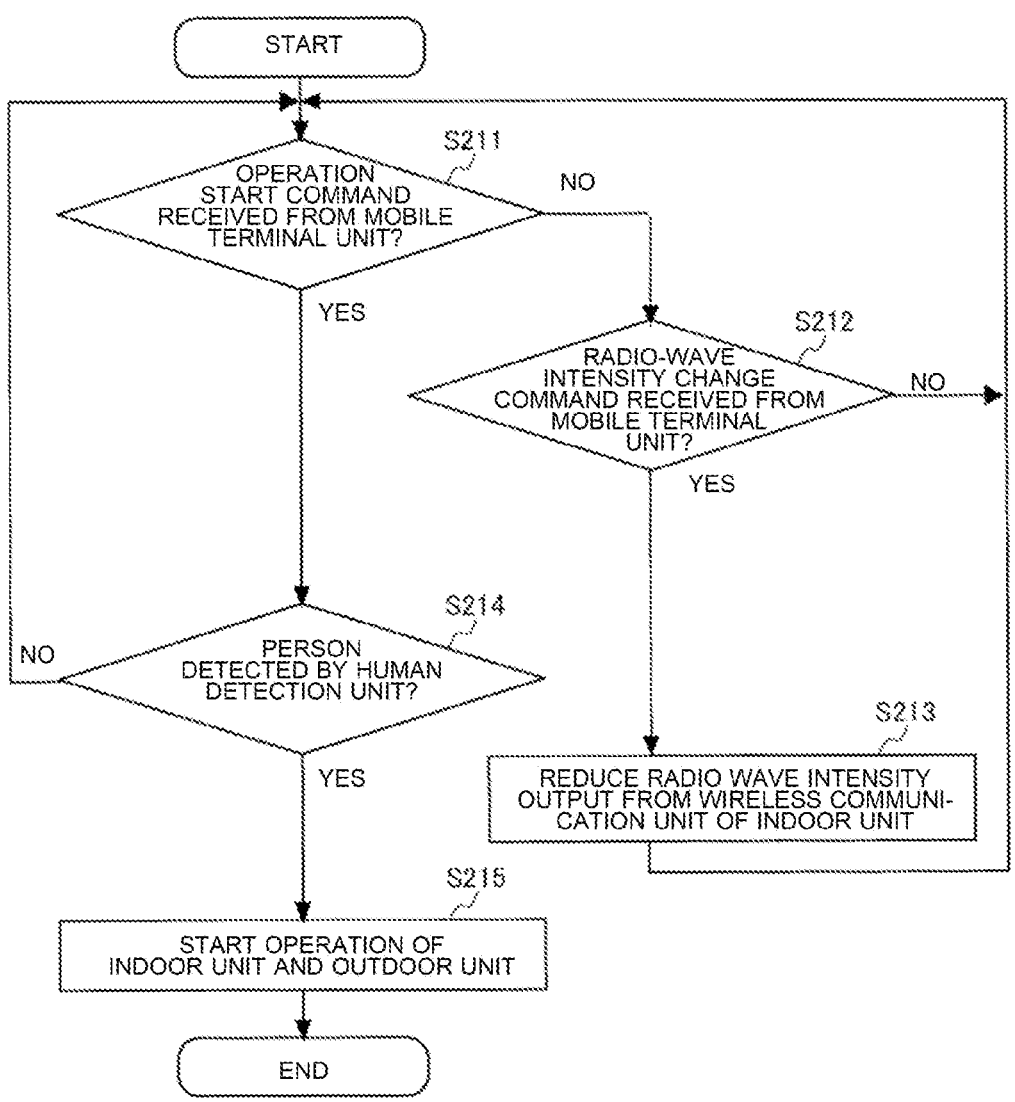
FIG. 8 is a flowchart of processing by the indoor unit up to the start of the operation of the indoor unit in the air-conditioning system according to Embodiment 2 of the present disclosure.

FIG. 8 is a flowchart illustrating processing by the indoor unit 2 up to the start of the operation of the indoor unit 2 in the air-conditioning system 100 according to Embodiment 2 of the present disclosure.

The processing by the indoor unit 2 up to the start of the operation of the indoor unit 2 in the air-conditioning system 100 according to Embodiment 2 will be described with reference to FIG. 8.

(Step S211)

The indoor-unit control unit 11 determines whether an operation start command is received from the mobile terminal unit 6 via the wireless communication unit 3 or not. When the indoor-unit control unit 11 determines that an operation start command is received from the mobile terminal unit 6 (YES), the process proceeds to step S214. By contrast, when the indoor-unit control unit 11 determines that an operation start command is not received from the mobile terminal unit 6 (NO), the process proceeds to step S212.

(Step S212)

The indoor-unit control unit 11 determines whether the wireless communication unit 3 receives a radio-wave intensity change command or not. When the indoor-unit control unit 11 determines that the wireless communication unit 3 receives a radio-wave intensity change command (YES), the process proceeds to step S213. By contrast, when the indoor-unit control unit 11 determines that the wireless communication unit 3 does not receive a radio-wave intensity change command (NO), the process proceeds to step S211.

(Step S213)

The indoor-unit control unit 11 reduces by a predetermined value the radio wave intensity of radio waves to be output from the wireless communication unit 3, and then the process proceeds to step S211.

(Step S214)

The indoor-unit control unit 11 determines whether a person is detected in the air-conditioned space of the indoor unit 2 by the human detection unit 4 or not. When the indoor-unit control unit 11 determines that a person is detected in the air-conditioned space of the indoor unit 2 (YES), the process proceeds to step S215. By contrast, when the indoor-unit control unit 11 determines that a person is not detected in the air-conditioned space of the indoor unit 2 (NO), the process proceeds to step S211.

Of various types of indoor units 2, a given type of indoor unit 2 does not include a human detection unit 4. In such a type of indoor unit 2, the determination operation of step S214 may not be performed. In this case, in the determination in step S211, when the indoor-unit control unit 11 determines that an operation start command is received from the mobile terminal unit 6 (YES), the process proceeds to step S215. It should be noted that in Embodiment 2, indoor units 2 that output radio waves whose radio wave intensities are ranked N-th or higher are operation targets that are indoor units to be operated, and from these indoor units 2, an indoor unit 2 that does not detect a person in the air-conditioned space is excluded. Therefore, the number of indoor units 2 that actually perform the air-conditioning operation may be less than N. Thus, when comfort is prioritized over energy saving, the processes (steps S101 to S114) of determining an indoor unit or units 2 as operation targets may be repeated until the number of indoor units 2 determined as the operation targets reaches N.

(Step S215)

The indoor-unit control unit 11 starts the operation of the indoor unit 2, and starts the operation of the outdoor unit 5 by transmitting an operation start command to the outdoor-unit control unit 14 via the wired communication line 7, thereby performing the air-conditioning operation.

As described above, in the air-conditioning system 100 according to Embodiment 2, the mobile terminal unit 6 ranks the detected radio waves in descending order of the radio wave intensity, and transmits an operation start command to wireless communication units 3 that emit radio waves of a predetermined rank or higher.

In the air-conditioning system 100 of Embodiment 2, the mobile terminal unit 6 ranks the detected radio waves in descending order of the radio wave intensity, and transmits an operation start command to wireless communication units 3 that emit radio waves having radio wave intensities of a predetermined rank or higher. Therefore, the user can customize requirements for determining an indoor unit or units 2 to be operated.

Furthermore, in the air-conditioning system 100 according to Embodiment 2, when detecting the same radio wave intensity or detecting a plurality of radio wave intensities within a predetermined range, the mobile terminal unit 6 transmits a radio-wave intensity change command to wireless communication units 3 that outputs radio waves having the same radio wave intensity or radio waves having radio wave intensities within the predetermined range. Furthermore, the wireless communication units 3 that have received the radio-wave intensity change command each reduce the radio wave intensity of radio waves to be output.

In the air-conditioning system 100 of Embodiment 2, when detecting the same radio wave intensities or detecting a plurality of radio wave intensities within a predetermined range, the mobile terminal unit 6 transmits a radio-wave intensity change command to wireless communication units 3 that output radio waves having the above radio wave intensities. It is therefore possible to accurately rank the distances between the indoor units 2 and the mobile terminal unit 6.

Embodiment 3

Embodiment 3 of the present disclosure will be described. Regarding Embodiment 3, descriptions that are made regarding Embodiment 1 and/or Embodiment 2 and can also be applied to Embodiment 3 will be omitted, and components that are the same or equivalent to those in Embodiment 1 and/or Embodiment 2 will be denoted by the same reference signs.

An air-conditioning system 100 according to Embodiment 3 carries out a process of causing an indoor unit 2 that is located in an air-conditioned space where a person is present to be selected with a higher probability as an operation target.

Figure 9:
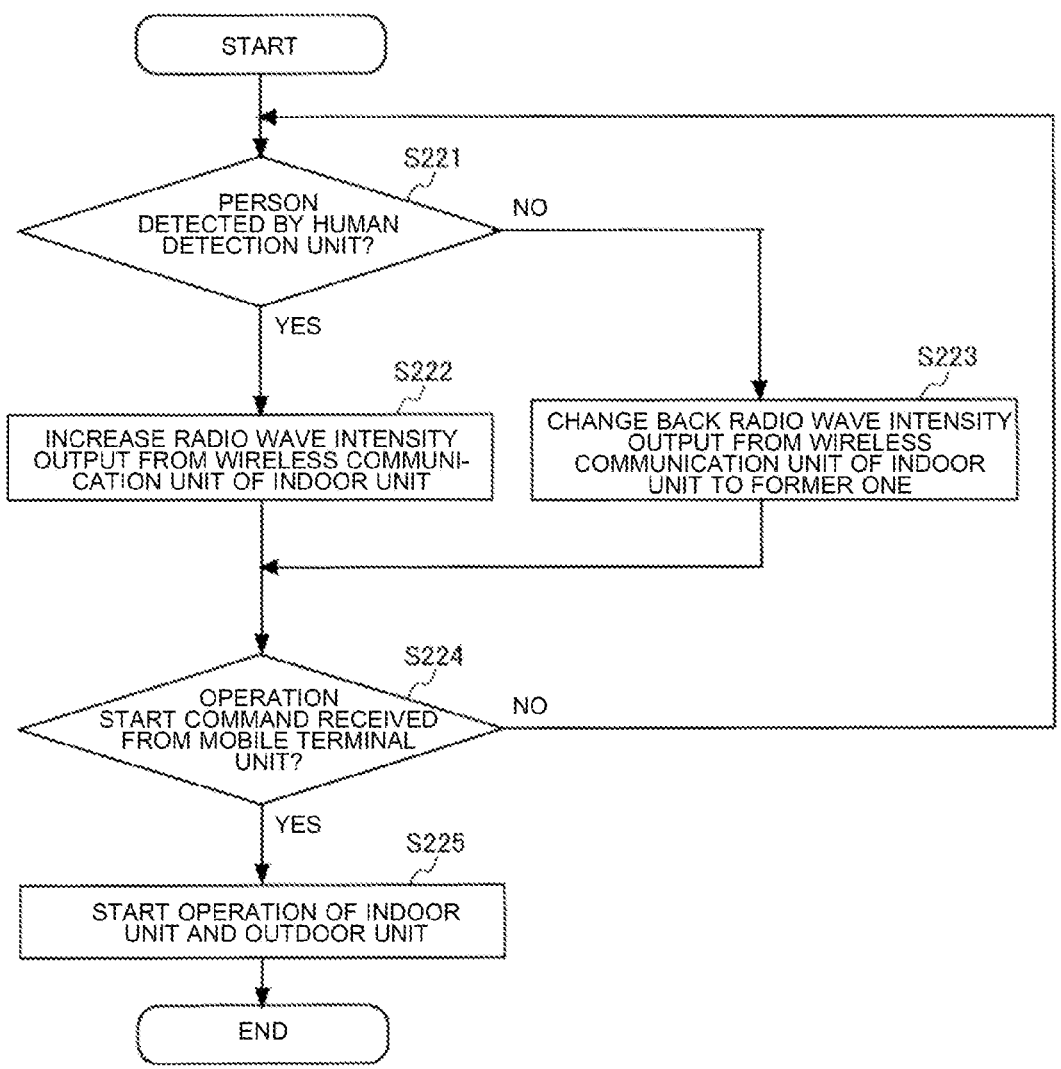
FIG. 9 is a flowchart of processing by an indoor unit up to the start of the operation of the indoor unit in an air-conditioning system according to Embodiment 3 of the present disclosure.

FIG. 9 is a flowchart illustrating processing by the indoor unit 2 up to the start of the operation of the indoor unit 2 in the air-conditioning system 100 according to Embodiment 3 of the present disclosure.

The processing by the indoor unit 2 up to the start of the operation in the air-conditioning system 100 according to Embodiment 3 will be described with reference to FIG. 9.

(Step S221)

The indoor-unit control unit 11 determines whether a person is detected in the air-conditioned space for the indoor unit 2 by the human detection unit 4 or not. When the indoor-unit control unit 11 determines that a person is detected in the air-conditioned space for the indoor unit 2 (YES), the process proceeds to step S222. By contrast, when the indoor-unit control unit 11 determines that a person is not detected in the air-conditioned space for the indoor unit 2 (NO), the process proceeds to step S223.

(Step S222)

The indoor-unit control unit 11 increases by a predetermined value, the radio wave intensity of radio waves to be output from the wireless communication unit 3. This is performed to cause an indoor unit 2 that is located in an air-conditioned space where a person is present to be selected with a higher probability as an operation target, by increasing the radio wave intensity of the radio waves to be output from the wireless communication unit 3. This process is skipped in the case where the radio wave intensity of the radio waves to be output from the wireless communication unit 3 has already been increased by a predetermined value.

(Step S223)

In the case where the radio wave intensity of radio waves to be output from the wireless communication unit 3 has already been increased by a predetermined value, the indoor-unit control unit 11 changes the radio wave intensity of the radio waves to be output from the wireless communication unit 3 back to the original value. This is intended to prevent an indoor unit 2 that is located in an air-conditioned space where no person is present from being selected with a higher probability as an operation target.

(Step S224)

The indoor-unit control unit 11 determines whether an operation start command is received from the mobile terminal unit 6 via the wireless communication unit 3 or not. When the indoor-unit control unit 11 determines that an operation start command is received from the mobile terminal unit 6 (YES), the process proceeds to step S225. By contrast, when the indoor-unit control unit 11 determines that an operation start command is not received from the mobile terminal unit 6 (NO), the process proceeds to step S221.

(Step S225)

The indoor-unit control unit 11 starts the operation of the indoor unit 2, and starts the operation of the outdoor unit 5 by transmitting an operation start command to the outdoor-unit control unit 14 via the wired communication line 7, thereby performing the air-conditioning operation.

As described above, in the air-conditioning system 100 according to Embodiment 3, the indoor unit 2 increases the radio wave intensity of radio waves to be emitted by the wireless communication unit 3, when the human detection unit 4 detects a person.

In the air-conditioning system 100 of Embodiment 3, the indoor unit 2 increases the radio wave intensity of radio waves to be output by the wireless communication unit 3, when the human detection unit 4 detects a person. It is therefore possible to cause an indoor unit 2 that is located in an air-conditioned space where a person is present to be selected with a higher probability as an operation target. It should be noted that the process in which the indoor unit 2 increases the radio wave intensity of radio waves to be emitted by the wireless communication unit 3 when the human detection unit 4 detects a person is also effective for the case where indoor units 2 ranked N-th or higher are not detected in Embodiment 2.

Embodiment 4

Embodiment 4 of the present disclosure will be described. Regarding Embodiment 4, descriptions that are made regarding any of Embodiments 1 to 3 and can also be applied to Embodiment 4 will be omitted, and components that are the same as or equivalent to those in any of Embodiments 1 to 3 will be denoted by the same reference signs.

An air-conditioning system 100 according to Embodiment 4 performs a process of causing an indoor unit 2 that is located in an air-conditioned space where a person is present to be selected with a higher probability as an operation target, as in Embodiment 3.

Figure 10:
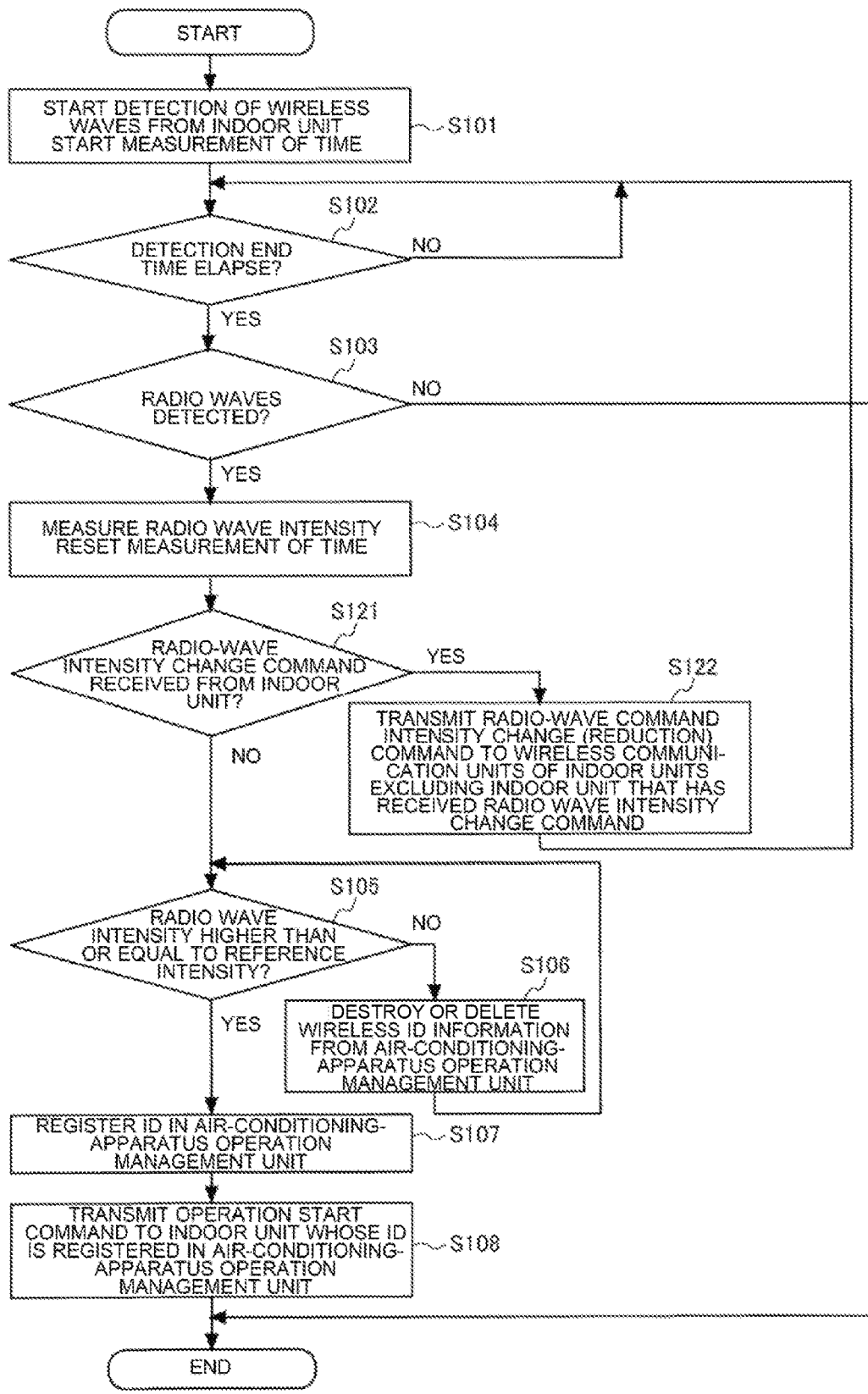
FIG. 10 is a flowchart of processing by a mobile terminal unit up to the start of the operation of an indoor unit in an air-conditioning system according to Embodiment 4 of the present disclosure.

FIG. 10 is a flowchart illustrating processing by the mobile terminal unit 6 up to the start of the operation of the indoor unit 2 in the air-conditioning system 100 according to Embodiment 4 of the present disclosure.

The processing by the mobile terminal unit 6 up to the start of the operation of the indoor unit 2 in the air-conditioning system 100 according to Embodiment 4 will be described with reference to FIG. 10.

The processes of steps S101 to S108 are the same as those of Embodiment 1, and their description will thus be omitted.
(Step S121)

The air-conditioning-apparatus operation management unit 15 determines whether the mobile-terminal side wireless communication unit 9 receives a radio-wave intensity change command or not. As described below, the radio-wave intensity change command is transmitted by an indoor unit 2 in which a person is detected in an air-conditioned space by the human detection unit 4 to cause the indoor unit 2 to be selected with a higher probability as an operation target. When the air-conditioning-apparatus operation management unit 15 determines that the mobile-terminal side wireless communication unit 9 has received a radio-wave intensity change command (YES), the process proceeds to step S122. By contrast, when the air-conditioning-apparatus operation management unit 15 determines that the mobile-terminal side wireless communication unit 9 has not received a radio-wave intensity change command (NO), the process proceeds to step S105.
(Step S122)

The air-conditioning-apparatus operation management unit 15 confirms the radio ID of a wireless communication unit 3 that has transmitted the radio-wave intensity change command, and transmits a radio-wave intensity change command for reducing by a predetermined value, the radio wave intensity of radio waves to be output, to the wireless communication units 3 of the indoor units 2 excluding the indoor unit 2 including the wireless communication unit 3 having the above radio ID. Then, the process proceeds to step S102.

Figure 11:
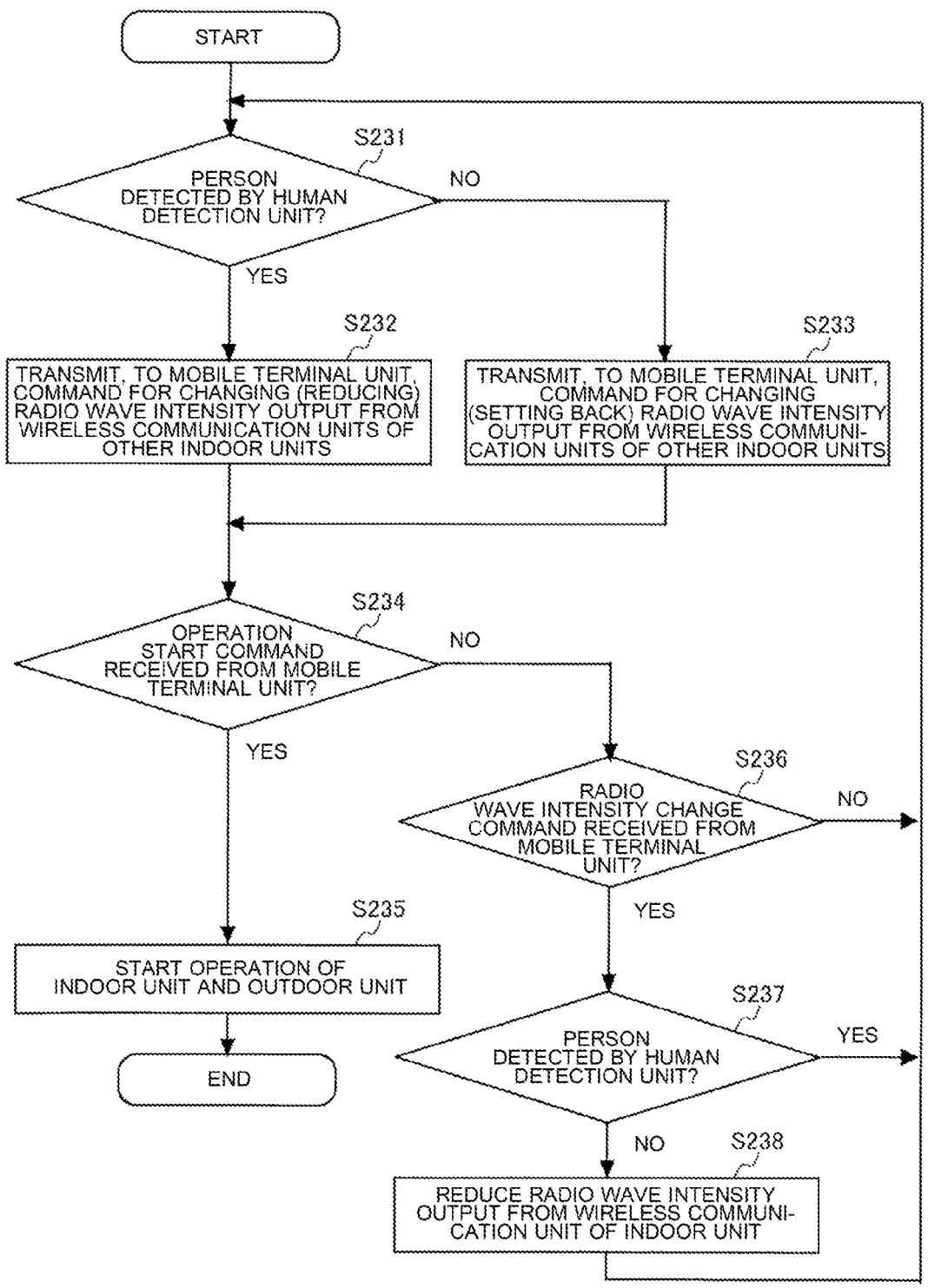
FIG. 11 is a flowchart of processing by the indoor unit up to the start of the operation of the indoor unit in the air-conditioning system according to Embodiment 4 of the present disclosure.

FIG. 11 is a flowchart of processing by the indoor unit 2 up to the start of the operation of the indoor unit 2 in the air-conditioning system 100 according to Embodiment 4 of the present disclosure.

The processing by the indoor unit 2 up to the start of the operation in the air-conditioning system 100 according to Embodiment 4 will be described with reference to FIG. 11.
(Step S231)

The indoor-unit control unit 11 determines whether a person is detected in the air-conditioned space for the indoor unit 2 by the human detection unit 4 or not. When the indoor-unit control unit 11 determines that a person is detected in the air-conditioned space for the indoor unit 2 (YES), the process proceeds to step S232. By contrast, when the indoor-unit control unit 11 determines that a person is not detected in the air-conditioned space of the indoor unit 2 (NO), the process proceeds to step S233.
(Step S232)

The indoor-unit control unit 11 transmits a radio-wave intensity change command for reducing by a predetermined value, the radio wave intensity of radio waves to be output from the wireless communication unit 3 of each of the other indoor units 2 to the mobile-terminal side wireless communication unit 9. This is performed to cause an indoor unit 2 that is located in an air-conditioned space where a person is present to be selected with a higher probability as an operation target, by reducing the radio wave intensity of the radio waves to be output from each of the wireless communication units 3 of the other indoor units 2 to relatively increase the radio wave intensity of radio waves to be output from the wireless communication unit 3 of the above indoor unit 2. It should be noted that when a radio-wave intensity change command for reducing the radio wave intensity of the radio waves to be output from the wireless communication unit 3 of each of the other indoor units 2 has already been transmitted, this process is skipped.
(Step S233)

In the case where the radio-wave intensity change command for reducing the radio wave intensity of radio waves to be output from the wireless communication unit 3 of each of the other indoor units 2 has already been transmitted, the indoor-unit control unit 11 transmits a radio-wave intensity change command for changing back the radio wave intensity of the radio waves to be output from the wireless communication unit 3 of each of the other indoor units 2 to the original radio wave intensity to the mobile-terminal side wireless communication unit 9. This is performed to prevent an indoor unit 2 that is located in an air-conditioned space where no person is present from being selected with a higher probability as an operation target.
(Step S234)

The indoor-unit control unit 11 determines whether an operation start command is received from the mobile terminal unit 6 via the wireless communication unit 3 or not. When the indoor-unit control unit 11 determines that an operation start command is received from the mobile terminal unit 6 (YES), the process proceeds to step S235. By contrast, when the indoor-unit control unit 11 determines that an operation start command is not received from the mobile terminal unit 6 (NO), the process proceeds to step S236.

(Step S235)

The indoor-unit control unit 11 starts the operation of the indoor unit 2, and starts the operation of the outdoor unit 5 by transmitting an operation start command to the outdoor-unit control unit 14 via the wired communication line 7, thereby performing the air-conditioning operation.

(Step S236)

The indoor-unit control unit 11 determines whether the wireless communication unit 3 receives the radio-wave intensity change command or not. When the indoor-unit control unit 11 determines that the wireless communication unit 3 receives the radio-wave intensity change command (YES), the process proceeds to step S237. By contrast, when the indoor-unit control unit 11 determines that the wireless communication unit 3 does not receive the radio-wave intensity change command (NO), the process proceeds to step S231.

(Step S237)

The indoor-unit control unit 11 determines whether a person is detected in the air-conditioned space for the indoor unit 2 by the human detection unit 4 or not. When the indoor-unit control unit 11 determines that a person is detected in the air-conditioned space for the indoor unit 2 (YES), the process proceeds to step S231. By contrast, when the indoor-unit control unit 11 determines that a person is not detected in the air-conditioned space for the indoor unit 2 (NO), the process proceeds to step S238.

(Step S238)

The indoor-unit control unit 11 reduces by a predetermined value, the radio wave intensity of radio waves to be output from the wireless communication unit 3, and then the process proceeds to step S231.

As described above, in the air-conditioning system 100 according to Embodiment 4, the indoor unit 2 transmits the radio-wave intensity change command to the mobile terminal unit 6 when the human detection unit 4 detects a person. Furthermore, when receiving the radio-wave intensity change command, the mobile terminal unit 6 transmits the radio-wave intensity change command to the wireless communication units 3 excluding the wireless communication unit 3 that has transmitted the above radio-wave intensity change command.

In the air-conditioning system 100 of Embodiment 4, when receiving the radio-wave intensity change command, the mobile terminal unit 6 transmits the radio-wave intensity change command to the wireless communication units 3 excluding the wireless communication unit 3 that has transmitted the radio-wave intensity change command. Therefore, the radio wave intensity of radio waves to be output from each of the wireless communication units 3 of the indoor units 2 excluding the indoor unit 2 that has detected a person via the human detection unit 4 is reduced to relatively increase the radio wave intensity of radio waves to be output from the wireless communication unit 3 of the above indoor unit 2. It is therefore possible to cause the indoor unit 2 that is located in an air-conditioned space where a person is present to be selected with a higher probability as an operation target.

Embodiment 5

Embodiment 5 of the present disclosure will be described. Regarding Embodiment 5, descriptions that are made regarding any of Embodiments 1 to 4 and can also be applied to Embodiment 5 will be omitted, and components that are the same as or equivalent to those in any of Embodiments 1 to 4 will be denoted by the same reference signs.

Figure 12:
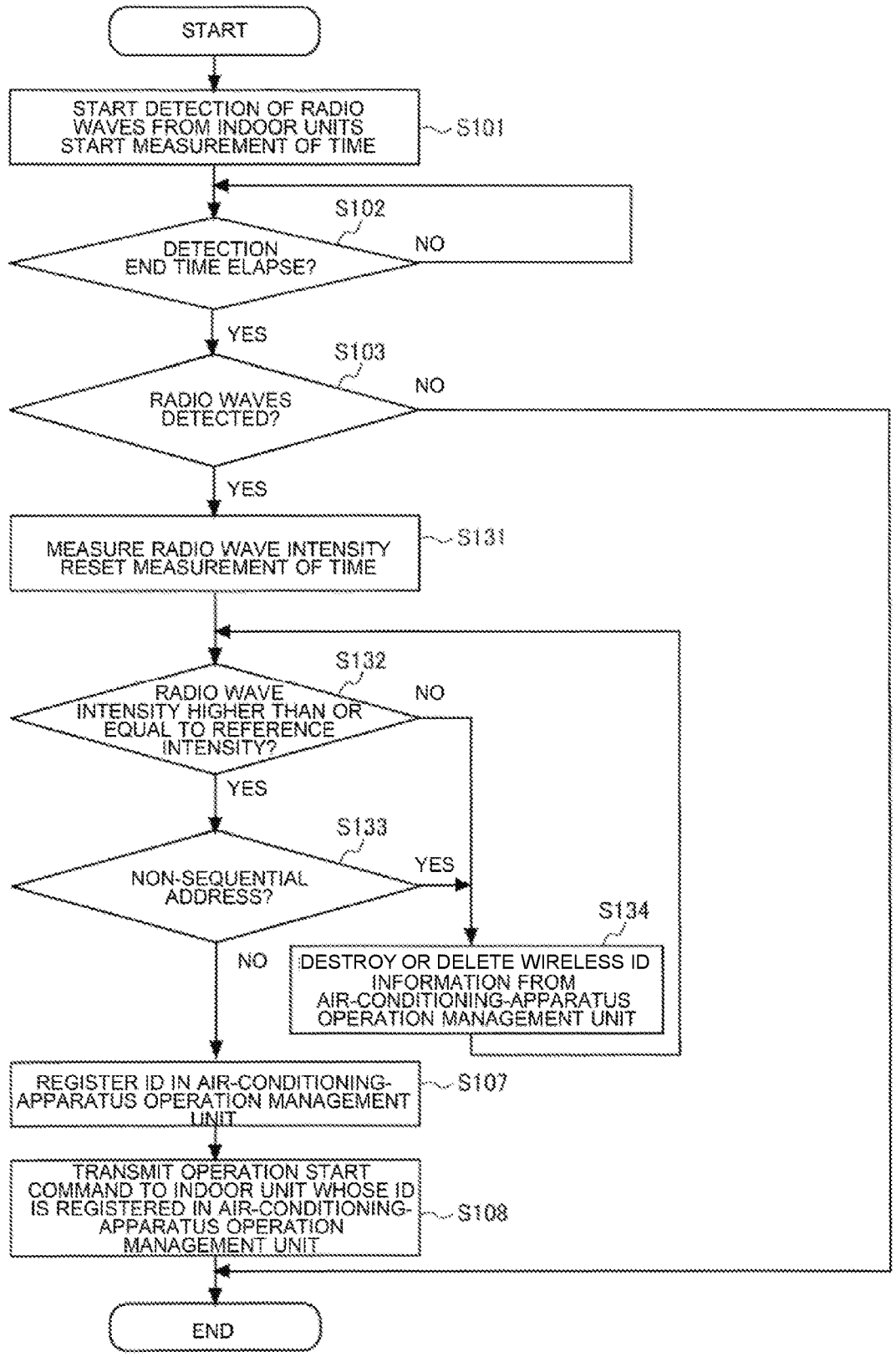
FIG. 12 is a flowchart of processing by a mobile terminal unit up to the start of the operation of an indoor unit in an air-conditioning system according to Embodiment 5 of the present disclosure.
Figure 13:
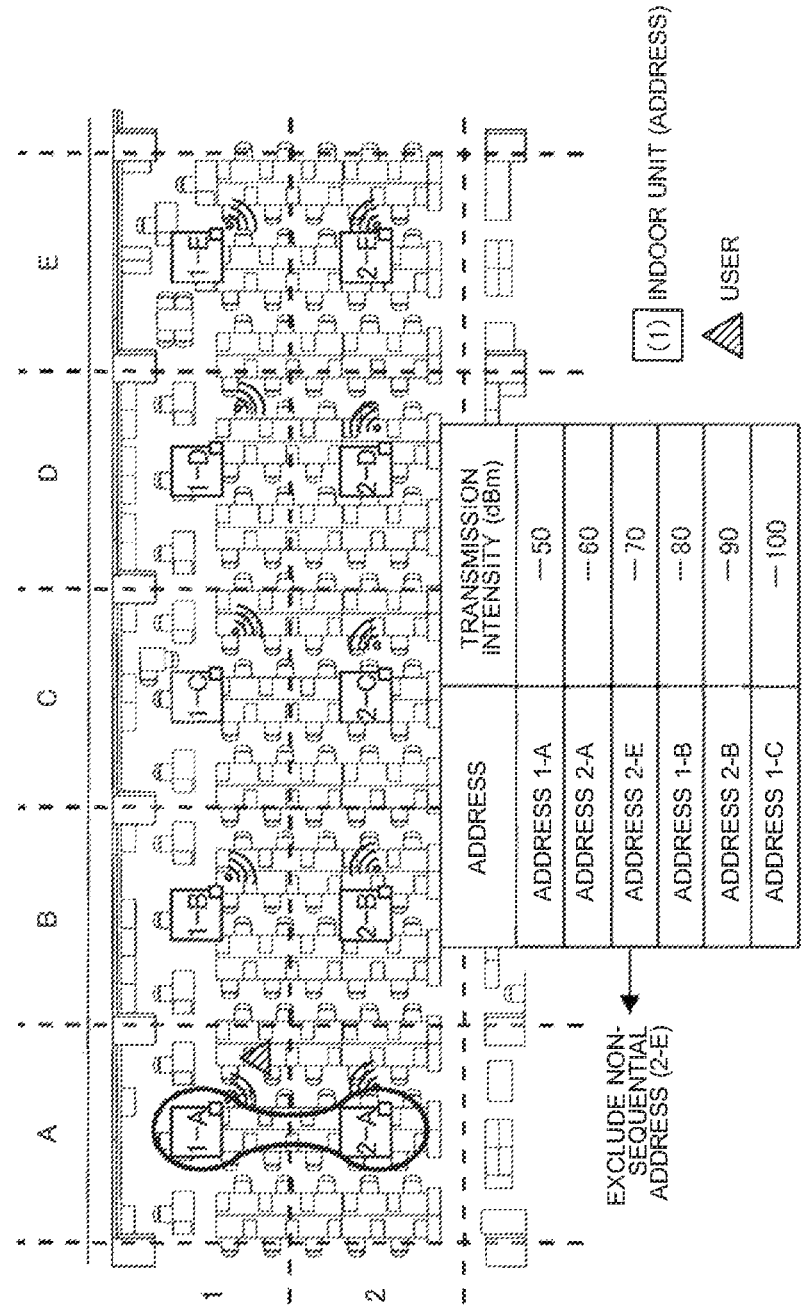
FIG. 13 is a diagram for explaining the process of excluding an indoor unit having a non-sequential address from operation targets in the air-conditioning system according to Embodiment 5.

FIG. 12 is a flowchart of processing by the mobile terminal unit 6 up to the start of the operation of the indoor unit 2 in the air-conditioning system 100 according to Embodiment 5 of the present disclosure. FIG. 13 is a diagram for explaining the processing of excluding an indoor unit 2 having a non-sequential address from the operation targets in the air-conditioning system 100 according to Embodiment 5. It should be noted that the term "non-sequential address" means an address of a plurality of addresses that does not sequentially precede or antecede any of the other addresses. A non-sequential address is effective in the case where addresses are determined according to a certain rule, such as a rule in which each of columns is represented by an alphabetical letter and each of rows is represented by a number, as illustrated in FIG. 13.

The processing by the mobile terminal unit 6 up to the start of the operation of the indoor unit 2 in the air-conditioning system 100 according to Embodiment 5 will be described with reference to FIGS. 12 and 13.

The processes of steps S101 to S103, S107, and S108 are the same as those of Embodiment 1, and their descriptions will thus be omitted.

(Step S131)

The air-conditioning-apparatus operation management unit 15 confirms the radio ID and address of a wireless communication unit 3 of the transmission side, and starts measuring the radio wave intensity (RSSI). Furthermore, the air-conditioning-apparatus operation management unit 15 resets the measured elapsed time from the time at which detection of radio waves is started. In order to measure fluctuations in the radio wave intensity, the air-conditioning-apparatus operation management unit 15 obtains the average or the central value from a plurality of measurement results to determine the radio wave intensity of the detected radio waves.

(Step S132)

The air-conditioning-apparatus operation management unit 15 determines whether the radio wave intensity of the detected radio waves that is determined in step S131 is higher than or equal to a predetermined reference intensity. When the air-conditioning-apparatus operation management unit 15 determines that the radio wave intensity of the detected radio waves is higher than or equal to the reference intensity (YES), the process proceeds to step S133. By contrast, when the air-conditioning-apparatus operation management unit 15 determines that the radio wave intensity of the detected radio waves is not higher than nor equal to the reference intensity (NO), the process proceeds to step S134.

(Step S133)

The air-conditioning-apparatus operation management unit 15 determines whether the address of the wireless communication unit 3 of the indoor unit 2 is a non-sequential address or not. When the air-conditioning-apparatus operation management unit 15 determines that the address of the wireless communication unit 3 of the indoor unit 2 is a non-sequential address (YES), the process proceeds to step S134. By contrast, when the air-conditioning-apparatus operation management unit 15 determines that the address of the wireless communication unit 3 of the indoor unit 2 is not a non-sequential address (NO), the process proceeds to step S107.

(Step S134)

The air-conditioning-apparatus operation management unit 15 destroys the radio ID information on a wireless communication unit 3 of an indoor unit 2 that outputs radio waves having a radio wave intensity less than the reference intensity or that has a non-sequential address.

It is assumed that as illustrated in FIG. 13, for example, the addresses of the wireless communication units 3 of indoor units 2 that output radio waves having radio wave intensities higher than or equal to a predetermined reference intensity (higher than or equal to −70 dBm) are "1-A", "2-A", and "2-E". In this case, although "1-A" and "2-A" are sequential addresses for each other, "2-E" is not a sequential address for "1-A" or "2-A", that is it is a non-sequential address for "1-A" and "2-A". Therefore, the radio ID of a wireless communication unit 3 of an indoor unit 2 that has the address "2-E" is excluded from those of the operation targets. This is intended to prevent the air-conditioning-apparatus operation management unit 15 from performing an erroneous detection of the radio wave intensity due to an obstacle or other factors. That is, in some cases, the air-conditioning-apparatus operation management unit 15 erroneously detects as radio waves having a higher radio wave intensity, radio waves emitted from the wireless communication unit 3 of an indoor unit 2 that is located farther from the mobile terminal unit 6 than radio waves emitted from the wireless communication unit 3 of an indoor unit 2 that is located closer to the mobile terminal unit 6. In view of this, in steps S133 and S134, the radio ID of a wireless communication unit 3 of an indoor unit 2 that has a non-sequential address as described above is excluded from those of the operation targets, whereby it is possible to prevent an erroneous detection of the radio wave intensity. It should be noted that the radio ID may be associated with the position of the indoor unit 2 instead of the address to prevent an erroneous detection of the radio wave intensity as described above.

When the air-conditioning-apparatus operation management unit 15 detects a number of radio waves in step S103, the processes of steps S131 to S134 are carried out the same number of times as the number of detected radio waves.

It should be noted that in step S132, the air-conditioning-apparatus operation management unit 15 may make the following determination with respect to the radio wave intensity of the detected radio waves that is determined in step S131, based on a predetermined first reference intensity (equal to the reference intensity described above) and a predetermined second reference intensity (<first radio wave intensity). In this case, the air-conditioning-apparatus operation management unit 15 determines whether the radio wave intensity of the detected radio waves that is determined in step S131 is higher than or equal to the predetermined second reference intensity. When the air-conditioning-apparatus operation management unit 15 determines that the radio wave intensity of the detected radio waves is neither higher nor equal to the second reference intensity (NO), the process proceeds to step S134. By contrast, when the air-conditioning-apparatus operation management unit 15 determines that the radio wave intensity of the detected radio waves is higher than or equal to the second reference intensity (YES), the air-conditioning-apparatus operation management unit 15 causes the air-conditioning-apparatus information display unit 17 to make a display notifying the user of an operable indoor unit or units 2 and the number of operable indoor units 2, and determines whether the radio wave intensity of the detected radio waves is higher than or equal to the first reference intensity. Then, when the air-conditioning-apparatus operation management unit 15 determines that the radio wave intensity of the detected radio waves is higher than or equal to the first reference intensity (YES), the process proceeds to step S133. By contrast, when the air-conditioning-apparatus operation management unit 15 determines that the radio wave intensity of the detected radio waves is neither higher than nor equal to the first reference intensity (NO), the process proceeds to step S134. That is, the first reference intensity is a reference value for determining whether or not to transmit an operation start command for starting the air-conditioning operation to the wireless communication unit 3 of the indoor unit 2, as well as the reference intensity described above, and the second reference intensity is a reference value for determining whether or not to notify the user of an operable indoor unit or units 2 and the number of operable indoor units 2. The first reference intensity and the second reference intensity are values that can be freely changed. Furthermore, since the air-conditioning-apparatus operation management unit 15 determines the radio wave intensity of the detected radio waves, based on the first reference intensity and the second reference intensity, it is possible to notify the user of an operable indoor unit or units 2 and the number of operable indoor units 2 in a wide area, and to determine an indoor unit 2 that is located close to the user, as an indoor unit 2 to be given the operation start command. In such a manner, since the presence of the operable indoor unit 2 that is located nearby and outputs radio waves having a high radio wave intensity is indicated as a notification based on the detected radio wave intensity, that is, since the presence of the operable indoor unit 2 close to the user is indicated as a notification, it is possible to easily operate the operable indoor unit 2 close to the user even in the environment where the positions of the indoor units 2 are often changed. Therefore, when the user does input for the setting operation for an arbitrary indoor unit 2, from the air-conditioning-apparatus operation management unit 15 of the mobile terminal unit 6, an operation start command is transmitted to the wireless communication unit 3 of the arbitrary indoor unit 2, whereby the comfort can be improved. Furthermore, it is possible to automatically transmit an operation start command to the wireless communication unit 3 of the indoor unit 2 located close to the mobile terminal unit 6, whereby the comfort can be improved. In addition, even in the case where an indoor unit 2 capable of performing radio operations and an indoor unit 2 not capable of radio operations are present together, it is possible to detect an operable indoor unit 2 from a wide area, and thus possible to reduce the probability with which no operable indoor unit 2 is detected.

As described above, in the air-conditioning system 100 according to Embodiment 5, the mobile terminal unit 6 acquires the address of a wireless communication unit 3 that emits radio waves having a radio wave intensity higher than or equal to a predetermined reference intensity. Then, the mobile terminal unit 6 excludes a wireless communication unit 3 having a non-sequential address, from transmission targets that are wireless communication units 3 to be given the operation start command.

In the air-conditioning system 100 according to Embodiment 5, since the wireless communication unit 3 having a non-sequential address is excluded from the transmission targets, it is possible to prevent an erroneous detection of the radio wave intensity.

Embodiment 6

Embodiment 6 of the present disclosure will be described. Regarding Embodiment 6, descriptions that are made regarding any of Embodiments 1 to 5 and can also be applied to Embodiment 6 will be omitted, and components that are the same as or equivalent to those in any of Embodiments 1 to 5 will be denoted by the same reference signs.

In the air-conditioning system 100 according to Embodiment 6, based on the radio wave intensities of radio waves output form the wireless communication units 3 of the indoor units 2, the user manually groups indoor units 2, that is, selects indoor units 2 to be grouped and determine the selected indoor units 2 as a group. This grouping covers the case where a plurality of indoor units 2 to be collectively subjected to a setting operation are grouped only once, that is, the case where grouping of the indoor units 2 once is canceled afterward.

Figure 14:
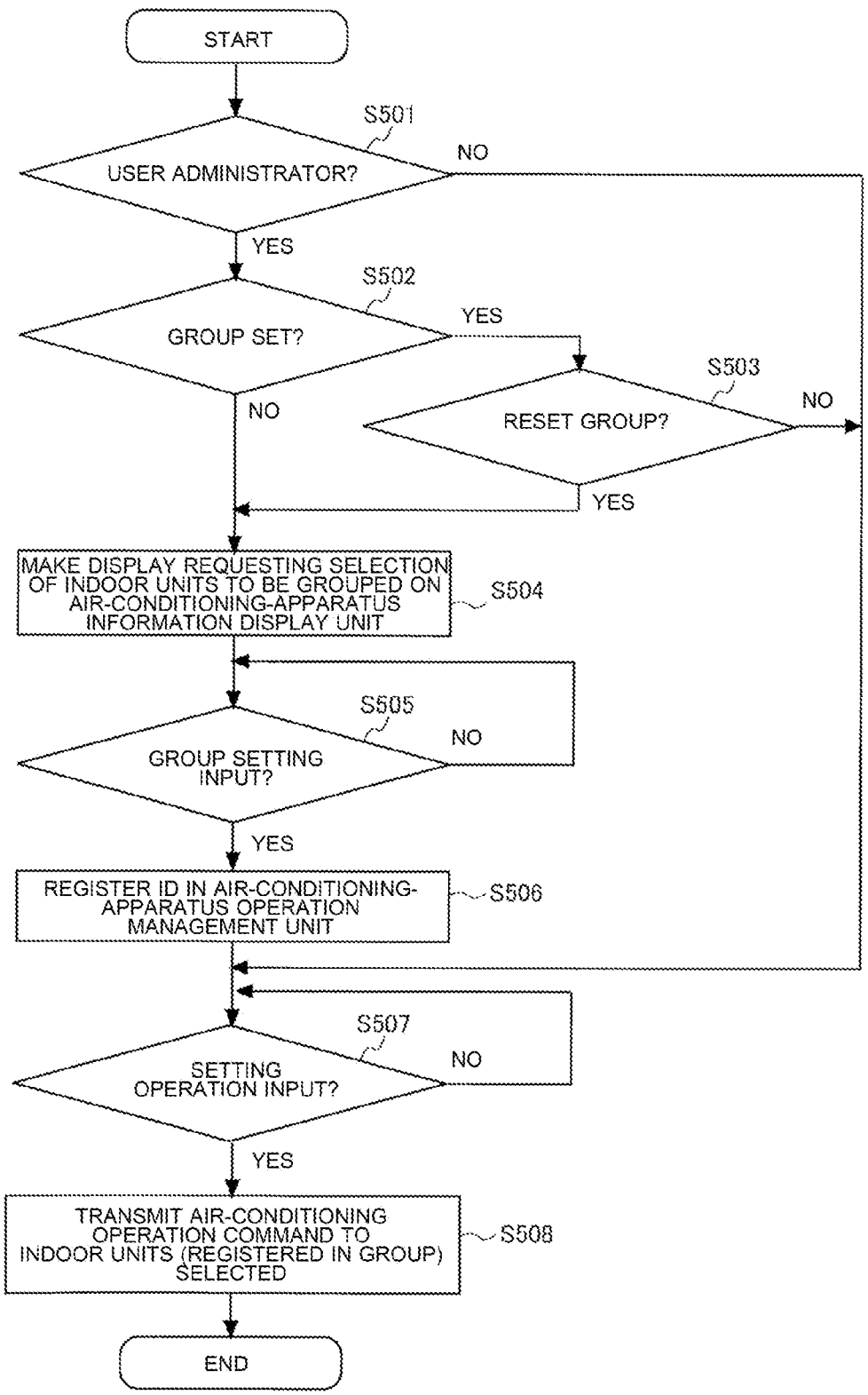
FIG. 14 is a flowchart of processing of grouping a group of indoor units using a mobile terminal unit in an air-conditioning system according to Embodiment 6 of the present disclosure.
Figure 15:
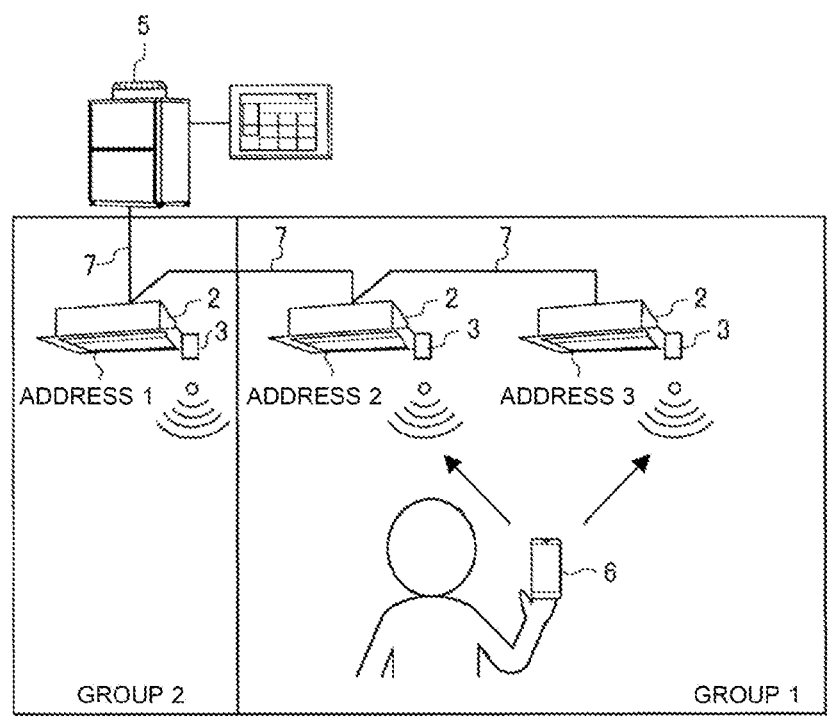
FIG. 15 is a diagram for explaining groups in the air-conditioning system according to Embodiment 6 of the present disclosure.

FIG. 14 is a flowchart illustrating processing of grouping indoor units 2 using the mobile terminal unit 6 in the air-conditioning system 100 according to Embodiment 6 of the present disclosure. FIG. 15 is a diagram for explaining groups in the air-conditioning system 100 according to Embodiment 6 of the present disclosure.

The processing of grouping indoor units 2 using the mobile terminal unit 6 in the air-conditioning system 100 according to Embodiment 6 will be described with reference to FIGS. 14 and 15.
(Step S501)

When receiving an input of a user ID from the air-conditioning-apparatus operation input unit 16, the air-conditioning-apparatus operation management unit 15 determines whether the user is an administrator, based on user ID information. It should be noted that the user ID information is stored in the air-conditioning-apparatus operation management unit 15. When the air-conditioning-apparatus operation management unit 15 determines that the user is an administrator (YES), the process proceeds to step S502. By contrast, when the air-conditioning-apparatus operation management unit 15 determines that the user is not an administrator (NO), the process proceeds to step S507. It should be noted that the user ID information may be stored in a storage unit other than the air-conditioning-apparatus operation management unit 15.
(Step S502)

The air-conditioning-apparatus operation management unit 15 determines whether a group is determined by setting in advance. This "group" means a group of indoor units 2 that are collectively subjected to a setting operation. For example, as illustrated in FIG. 15, when two indoor units 2 belong to group 1, group 1 is selected. Then, when an operation for starting an operation is performed on group 1, an operation start command is transmitted to both the two indoor units 2 belonging to group 1. It should be noted that group information is registered in the air-conditioning-apparatus operation management unit 15 such that the number of the group is associated with information on radio IDs of the wireless communication units 3 of the indoor units 2 belonging to the group. When the air-conditioning-apparatus operation management unit 15 determines that a group is determined by setting in advance (YES), the process proceeds to step S503. By contrast, when the air-conditioning-apparatus operation management unit 15 determines that a group is not determined by setting in advance (NO), the process proceeds to step S504. It should be noted that the group information may be stored in a storage unit other than the air-conditioning-apparatus operation management unit 15.
(Step S503)

The air-conditioning-apparatus operation management unit 15 causes the air-conditioning-apparatus information display unit 17 to make a display that prompts the user to make an input indicating whether the group is to be reset or not. After the user makes an input indicating whether the group is to be reset or not, using the air-conditioning-apparatus operation input unit 16, the air-conditioning-apparatus operation management unit 15 determines whether the input indicating that the group is to be reset is received from the air-conditioning-apparatus operation input unit 16 or not. When the air-conditioning-apparatus operation management unit 15 determines that the input indicating that the group is to be reset is received from the air-conditioning-apparatus operation input unit 16 (YES), the process proceeds to step S504. By contrast, when the air-conditioning-apparatus operation management unit 15 determines that the input indicating that the group is not to be reset is received from the air-conditioning-apparatus operation input unit 16 (NO), the process proceeds to step S507.
(Step S504)

The air-conditioning-apparatus operation management unit 15 causes the air-conditioning-apparatus information display unit 17 to display a list of the indoor units 2, and to display information that prompt the user to select indoor units 2 to be collectively subjected to the setting operation, that is, to select indoor units 2 to be grouped.
(Step S505)

The air-conditioning-apparatus operation management unit 15 determines whether indoor units 2 to be grouped are selected using the air-conditioning-apparatus operation input unit 16 or not, that is, whether an input for group setting is received or not. When the air-conditioning-apparatus operation management unit 15 determines that an input for group setting is received from the air-conditioning-apparatus operation input unit 16 (YES), the process proceeds to step S506. By contrast, when the air-conditioning-apparatus operation management unit 15 determines that an input for group setting is not received from the air-conditioning-apparatus operation input unit 16 (NO), the process does not proceed until an input of group setting is received, that is, it is waited for that an input for group setting is received.
(Step S506)

The air-conditioning-apparatus operation management unit 15 registers the number of the group in association with the radio ID of the wireless communication unit or units 3 of the indoor unit or units 2 that belong to the group.
(Step S507)

The air-conditioning-apparatus operation management unit 15 determines whether an input for a setting operation such as starting an operation, stopping an operation, and temperature setting with respect to the group or the indoor unit 2, and selection of the group or the indoor unit 2 to be subjected to that setting operation is received from the air-conditioning-apparatus operation input unit 16 or not. When the air-conditioning-apparatus operation management unit 15 determines that an input for a setting operation and other operations is received from the air-conditioning-apparatus operation input unit 16 (YES), the process proceeds to step S508. By contrast, when the air-conditioning-apparatus operation management unit 15 determines that an input for a setting operation and other operations are not received from the air-conditioning-apparatus operation input unit 16 (NO), the process does not proceed until an input of a setting operation is received, that is, it is awaited for that an input of a setting operation is received.
(Step S508)

The air-conditioning-apparatus operation management unit 15 transmits an air-conditioning operation command to the wireless communication unit 3 of the selected indoor unit 2, or all the wireless communication units 3 of indoor units 2 having radio IDs registered with respect to the selected group.

The processing by the indoor unit 2 is the same as that described regarding, for example, Embodiment 1, and its description will thus be omitted.

As described above, the air-conditioning system 100 of Embodiment 6 includes the plurality of indoor units 2 that include respective wireless communication units 3 that emit radio waves, and the mobile terminal unit 6 that wirelessly communicates with the wireless communication units 3. The mobile terminal unit 6 includes the air-conditioning-apparatus operation input unit 16 that receives an input from the user, the air-conditioning-apparatus information display unit 17 that displays information for the user, and the air-conditioning-apparatus operation management unit 15 that controls the indoor units 2. The air-conditioning-apparatus operation management unit 15 causes the air-conditioning-apparatus information display unit 17 to display a list of the indoor units 2, and to display information that prompts the user to select indoor units 2 to be collectively subjected to a setting operation. When one or more of the indoor units 2 are selected using the air-conditioning-apparatus operation input unit 16, the air-conditioning-apparatus operation management unit 15 determines the selected indoor units 2 as a group.

In the air-conditioning system 100 according to Embodiment 6, the air-conditioning-apparatus operation management unit 15 causes the air-conditioning-apparatus information display unit 17 to display a list of the indoor units 2, and to display information that prompts the user to select indoor units 2 to be collectively subjected to a setting operation. When one or more of the indoor units 2 are selected using the air-conditioning-apparatus operation input unit 16, the air-conditioning-apparatus operation management unit 15 determines the selected indoor units 2 as a group. It is therefore possible to easily group indoor units, and to flexibly change the indoor units 2 to be collectively subjected to the setting operation.

The invention claimed is:
1. An air-conditioning system comprising:
   a plurality of indoor units including respective wireless communication units each configured to emit radio waves; and
   a mobile terminal unit configured to wirelessly communicate with each of the wireless communication units;
   wherein the mobile terminal unit detects the radio waves emitted by the wireless communication units, and makes a notification indicating a presence of one or ones of the indoor units that are determined operable based on radio wave intensities of the detected radio waves, and when detecting the same radio wave intensity or detecting a plurality of radio wave intensities within a predetermined range, the mobile terminal unit transmits a radio-wave intensity change command to only ones of the wireless communication units that emit radio waves having the same radio wave intensity or the radio wave intensities within the predetermined range so as to limit radio wave intensity change to only between the mobile terminal unit and the only one or ones of the wireless communication units,
   wherein the mobile terminal unit determines the radio wave intensity of each of the detected radio waves, based on a plurality of predetermined reference intensities,
   wherein the mobile terminal unit includes an air-conditioning-apparatus information display unit configured to display information, and
   wherein when determining that the radio wave intensity of each of the detected radio waves is higher than or equal to a predetermined second reference intensity, the mobile terminal unit causes the air-conditioning-apparatus information display unit to make a display notifying a user of an operable one or ones of the indoor units and the number of the operable indoor units, and determines whether the radio wave intensity of each of the detected radio waves is higher than or equal to a predetermined first reference intensity higher than the second reference intensity, and then when determining as a result of the determination that the radio wave intensity of detected radio waves is higher than or equal to the first reference intensity, the mobile terminal unit transmits an air-conditioning operation command to one of the wireless communication units that emits radio waves whose radio wave intensity is higher than or equal to the first reference intensity.

2. The air-conditioning system of claim 1, wherein the mobile terminal unit ranks the detected radio waves in descending order of radio wave intensity, and transmits the air-conditioning operation command to one or ones of the wireless communication units that emit radio waves of a predetermined rank or higher.

3. The air-conditioning system of claim 1, wherein each of the wireless communication units that have received the radio-wave intensity change command reduce the radio wave intensity of radio waves to be emitted.

4. The air-conditioning system of claim 1, wherein each of the indoor units includes a human detection unit configured to detect a person.

5. The air-conditioning system of claim 4, wherein one or ones of the indoor units that have received the air-conditioning operation command with the wireless communication unit starts an operation of the indoor unit when the human detection unit of the indoor unit detects a person.

6. The air-conditioning system of claim 4, wherein when the human detection unit of each of the indoor units detects a person, the indoor unit increases the radio wave intensity of the radio waves to be emitted by the wireless communication unit of the indoor unit.

7. The air-conditioning system of claim 1, wherein in the mobile terminal unit, an application program is installed to cause the mobile terminal unit to perform
   a process of detecting the radio waves emitted by each of the wireless communication units, and
   a process of transmitting the air-conditioning operation command to one or ones of the wireless communication units that emit radio waves having a radio wave intensity higher than or equal to a predetermined reference intensity.

8. The air-conditioning system of claim 4,
   wherein the human detection unit uses acceleration data stored in the mobile terminal unit, or includes an acceleration sensor; and
   wherein each of the indoor units changes a radio sampling period of the wireless communication unit based on an acceleration detected by the human detection unit.

9. The air-conditioning system of claim 4,
   wherein the human detection unit uses acceleration data stored in the mobile terminal unit, or includes an acceleration sensor; and
   wherein each of the indoor units changes the radio wave intensity of the radio waves to be emitted by the wireless communication unit, based on an acceleration detected by the human detection unit.

10. The air-conditioning system of claim 1, wherein the mobile terminal unit is capable of transmitting environment data and ID data for identifying the mobile terminal unit to one or ones of the wireless communication units that emit radio waves whose radio wave intensity is higher than or equal to a predetermined reference intensity.

11. An air-conditioning system comprising:
a plurality of indoor units including respective wireless communication units each configured to emit radio waves; and
a mobile terminal unit configured to wirelessly communicate with each of the wireless communication units;
wherein the mobile terminal unit is configured to execute an application program that
detects the radio waves emitted by the wireless communication units,
determines whether one or more of the indoor units are operable by a user of the mobile terminal unit based on radio wave intensities of the detected radio waves being greater than or equal to a predetermined user operability reference intensity, and
responsive to determining that one or more of the indoor units are operable by the user, makes a notification to the user indicating a presence of the one or more of the indoor units that are determined to be operable by the user,
determines whether the same radio wave intensity or a plurality of radio wave intensities within a predetermined range is detected, and
responsive to determining that the same radio wave intensity or the plurality of radio wave intensities within the predetermined range is detected, transmit a radio-wave intensity change command to only ones of the wireless communication units that are determined to emit radio waves having the same radio wave intensity or the radio wave intensities within the predetermined range so as to limit radio wave intensity change to only between the mobile terminal unit and the only one or ones of the wireless communication units to clarify a distance to the mobile terminal unit,
wherein the mobile terminal unit determines the radio wave intensity of each of the detected radio waves, based on a plurality of predetermined reference intensities,
wherein the mobile terminal unit includes an air-conditioning-apparatus information display unit configured to display information, and
wherein when determining that the radio wave intensity of each of the detected radio waves is higher than or equal to a predetermined second reference intensity, the mobile terminal unit causes the air-conditioning-apparatus information display unit to make a display notifying a user of an operable one or ones of the indoor units and the number of the operable indoor units, and determines whether the radio wave intensity of each of the detected radio waves is higher than or equal to a predetermined first reference intensity higher than the second reference intensity, and then when determining as a result of the determination that the radio wave intensity of detected radio waves is higher than or equal to the first reference intensity, the mobile terminal unit transmits an air-conditioning operation command to one of the wireless communication units that emits radio waves whose radio wave intensity is higher than or equal to the first reference intensity.

* * * * *